US012733578B2

(12) United States Patent
Berry

(10) Patent No.: US 12,733,578 B2
(45) Date of Patent: Sep. 15, 2026

(54) MATERIAL PROCESSING BARREL AND ASSOCIATED MATERIAL PROCESSING SYSTEM

(71) Applicant: Seed Terminator Holdings Pty Ltd, South Australia (AU)

(72) Inventor: Nicholas Kane Berry, South Australia (AU)

(73) Assignee: Seed Terminator Holdings Pty Ltd, South Australia (AU)

(*) Notice: Subject to any disclaimer, the term of this patent is extended or adjusted under 35 U.S.C. 154(b) by 1042 days.

(21) Appl. No.: 17/767,782

(22) PCT Filed: Oct. 26, 2020

(86) PCT No.: PCT/AU2020/051154
§ 371 (c)(1),
(2) Date: Apr. 8, 2022

(87) PCT Pub. No.: WO2021/077180
PCT Pub. Date: Apr. 29, 2021

(65) Prior Publication Data

US 2024/0114840 A1 Apr. 11, 2024

(30) Foreign Application Priority Data

Oct. 25, 2019 (AU) ................................ 2019904039
Feb. 4, 2020 (AU) ................................ 2020900304
Jun. 3, 2020 (AU) ................................ 2020901832

(51) Int. Cl.
*A01F 12/40* (2006.01)
*A01D 41/12* (2006.01)
(Continued)

(52) U.S. Cl.
CPC .......... *A01D 41/1243* (2013.01); *A01F 12/40* (2013.01); *A01F 29/04* (2013.01); *A01F 29/09* (2013.01)

(58) Field of Classification Search
CPC .......... A01F 12/40; A01F 29/00–29/22; A01F 29/04; A01D 41/00–41/16; A01D 41/1243; B02C 2013/28672
See application file for complete search history.

(56) References Cited

U.S. PATENT DOCUMENTS 254,403 A 2/1882 Storer
2,557,865 A 6/1951 Emmanouilidis
(Continued)

FOREIGN PATENT DOCUMENTS

AU 1996071759 5/1997
AU 2018100350 5/2018
(Continued)

OTHER PUBLICATIONS

European Application No. 20879359.6, European Search Report dated Oct. 25, 2023, 9 pages.
(Continued)

*Primary Examiner* — Joseph M Rocca
*Assistant Examiner* — Madeline I Runco
(74) *Attorney, Agent, or Firm* — Andrus Intellectual Property Law, LLP

(57) ABSTRACT

A material processing system having a barrel also referred to hereinafter having a milling or impact surface and a central axis. The impact surface is impervious, in that material cannot pass through the surface, but rather is contained by the surface. An impact mechanism is located within barrel and is rotates about the central axis. The system has inlet openings and formed in the barrel at axially spaced locations along the axis. At least one outlet opening is formed in the
(Continued)

barrel at a location intermediate of the inlets. The impact mechanism includes a plurality of hammers mounted on shaft which rotates about the axis.

23 Claims, 25 Drawing Sheets

(51) Int. Cl.
*A01F 29/04* (2006.01)
*A01F 29/09* (2010.01)

(56) References Cited

U.S. PATENT DOCUMENTS

| | | | |
|---|---|---|---|
| 2,812,552 A | 11/1957 | Horton et al. | |
| 3,448,933 A | 6/1969 | Roy | |
| 3,829,030 A * | 8/1974 | Wallenfang | A01F 29/06 241/73 |
| 3,966,126 A | 6/1976 | Werner | |
| 3,966,128 A | 6/1976 | Anderson et al. | |
| 4,076,177 A | 2/1978 | Hirayama et al. | |
| 4,813,619 A | 3/1989 | Tjumanok et al. | |
| 5,059,154 A | 10/1991 | Reyenga | |
| 10,314,232 B2 * | 6/2019 | Isaac | A01F 12/40 |
| 11,716,933 B2 * | 8/2023 | Bonetti | A01D 41/1243 56/126 |
| 2002/0170993 A1 | 11/2002 | Elliott | |
| 2005/0013685 A1 | 1/2005 | Ricketts et al. | |
| 2005/0109864 A1 * | 5/2005 | Olson | B02C 13/282 241/189.1 |
| 2008/0185466 A1 | 8/2008 | Howard | |
| 2011/0070934 A1 | 3/2011 | Teroerde | |
| 2013/0105607 A1 | 5/2013 | Yoshikawa et al. | |
| 2014/0335923 A1 | 11/2014 | Biggerstaff et al. | |
| 2017/0055445 A1 * | 3/2017 | Mahieu | A01F 12/40 |
| 2017/0259270 A1 | 9/2017 | Watkins et al. | |
| 2018/0084718 A1 * | 3/2018 | Baumgarten | A01D 41/1243 |
| 2019/0168228 A1 | 6/2019 | Young | |
| 2019/0283034 A1 | 9/2019 | Berry | |
| 2020/0015419 A1 * | 1/2020 | Bonetti | A01D 41/12 |

FOREIGN PATENT DOCUMENTS

| | | | |
|---|---|---|---|
| CN | 208953500 | 6/2019 | |
| CN | 110198628 | 9/2019 | |
| DE | 3438609 C2 * | 8/1990 | A01F 12/40 |
| DE | 10203502 | 10/2003 | |
| EP | 0125396 A1 | 11/1984 | |
| EP | 0331784 A1 * | 9/1989 | A01F 12/40 |
| EP | 2187061 | 5/2010 | |
| EP | 3384754 A1 | 10/2018 | |
| EP | 3417695 A1 | 12/2018 | |
| EP | 4324323 A1 * | 2/2024 | A01D 41/1243 |
| FR | 2571926 A1 * | 4/1986 | A01F 12/40 |
| FR | 2776468 | 10/1999 | |
| RU | 2690480 | 6/2019 | |
| WO | 2001038781 | 10/2001 | |
| WO | 2009100500 | 8/2009 | |
| WO | 2012098292 | 7/2012 | |
| WO | WO-2018162974 A1 * | 9/2018 | A01D 41/12 |

OTHER PUBLICATIONS

International Search Report and the Written Opinion for PCT/AU2020/051154, dated Jan. 27, 2021.
International Preliminary Report on Patentability for PCT/AU2020/051154, dated Oct. 5, 2021.
Second Office Action of Chinese Patent Application No. 202080075248.8, dated May 17, 2024.
1 Extended European Search Report in European Patent Application No. 25185596.1, dated Oct. 28, 2025.

* cited by examiner

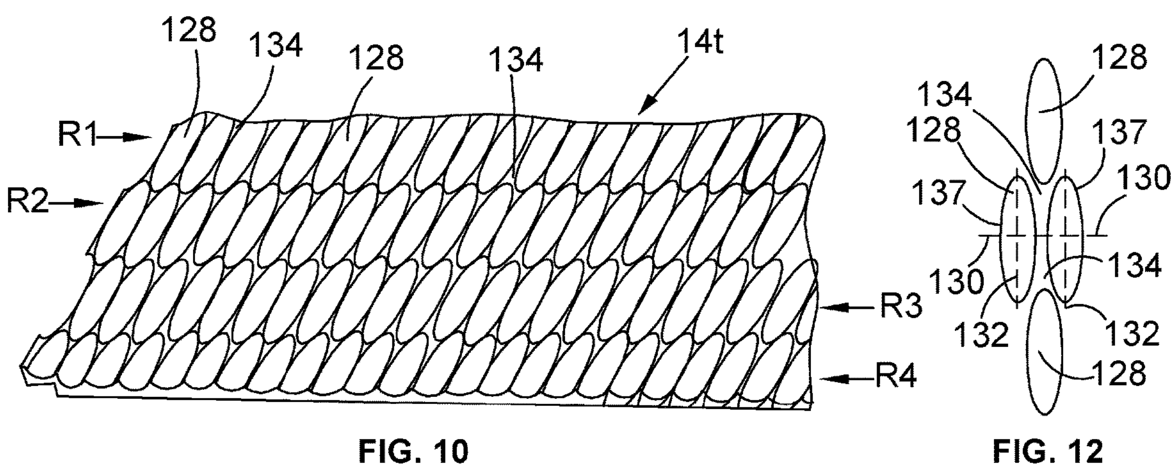
FIG. 10
FIG. 12
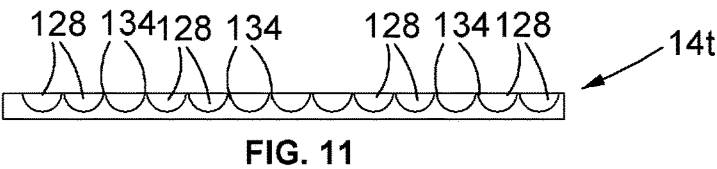
FIG. 11
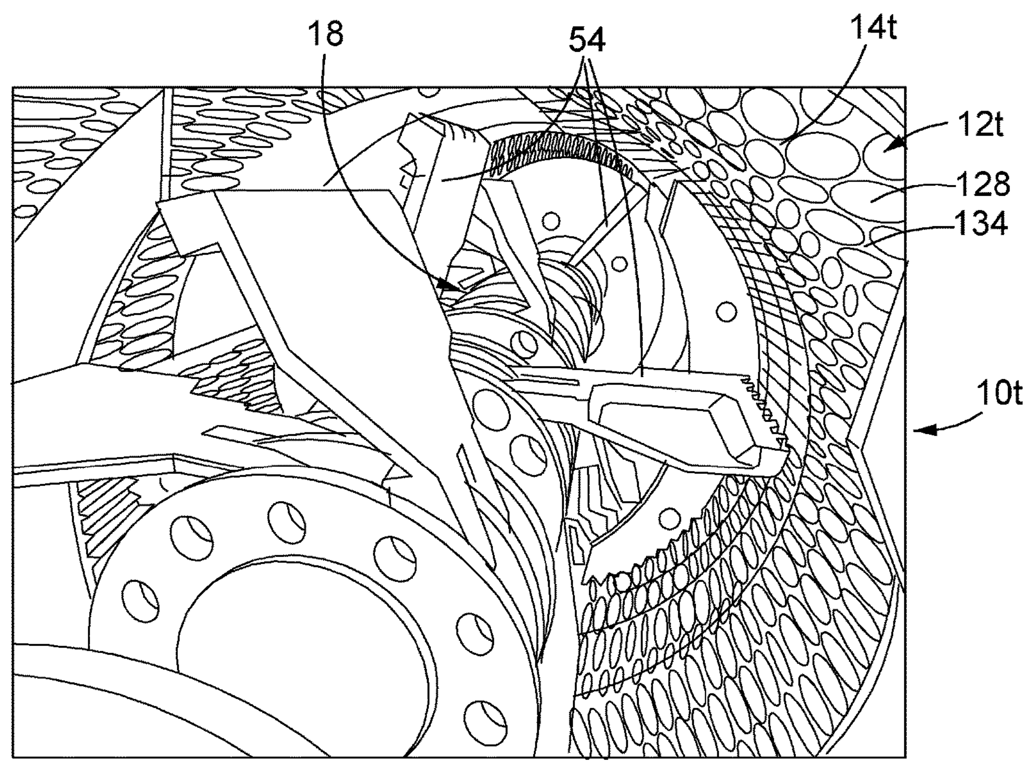
FIG. 13

96
84
86
88
90
92
94
96
20
20

MATERIAL PROCESSING BARREL AND ASSOCIATED MATERIAL PROCESSING SYSTEM

CROSS-REFERENCE TO RELATED APPLICATIONS

This application is the U.S. national stage application of International Application PCT/AU2020/051154, filed Oct. 26, 2020, which international application was published on Apr. 29, 2021, as International Publication WO 2021/077180 in the English language. The International Application claims priority of Australian Patent Application Nos. 2019904039, filed Oct. 25, 2019, 2020900304, filed Feb. 4, 2020, and 2020901832, filed Jun. 3, 2020. The international application and Australian applications are all incorporated herein by reference, in entirety.

TECHNICAL FIELD

A material processing barrel and associated material processing system are disclosed. The barrel and system may have application for processing weed seeds including those contained in chaff. In such an application the barrel and system can be mounted on a combine harvester to process weed seeds simultaneously with harvesting a crop.

BACKGROUND ART

Weeds and weed control are, and always have been, one of the biggest constraints and costs to grain production. Weeds are a perpetual problem that limits the food production capacity of agricultural area around the globe. Weeds compete with the cultivated crops for water, sunlight and nutrients. In the past 50 years there has been a shift from tillage, to the use of herbicides, as being the most valuable tool to control weeds. Herbicides in general give much better control of weeds than tillage methods and do not have the major issues of soil erosion, moisture loss and breakdown of soil structure. The wide spread use and reliance of herbicides has resulted weeds evolving resistance to herbicides. The herbicide resistance is now widespread and presents one of the biggest threats to global food security. Strategies to provide non-chemical weed control to compliment herbicides are now paramount to reduce the selection pressure for herbicide resistance. One method of significant renewed interest is destroying weed seeds at harvest time to interrupt the weed cycle.

Many crop weeds share a similar life cycle to harvested crops. Once a crop matures and is harvested, there is a broad range of weeds that have viable seeds remaining on the plant above the cutting height of the harvester. These weeds enter the harvester and their seeds either end up in a grain tank, out with straw residues, or out with chaff residues. There are a range of factors that determine where a weed seed will end up at harvest time including moisture content, maturity, and harvester setup. A major factor that determines where a seed ends up is the aerodynamic properties of the seeds or its terminal velocity. Often a weed seed is much lighter than the grain being harvested. Crop cleaning system used during harvesting employ a winnowing action to remove light chaff material from the heavier grain using airflow and mechanical sieving. The light weed seeds are caught in the wind and can exit the back of the harvester sieve. The residues and contained weed seeds are then spread on the ground to be a problem for next year. The residues also contain a proportion of grain being harvested that could not be separated by the harvester. This grain loss has the potential to become a volunteer weed after harvest. There is an opportunity to intercept and destroy weed seeds in the residues before allowing them to become a problem for next year's crop.

One method to destroy these weed seeds is to use a milling technology. Milling technology has been used for particle size reduction of a range of feedstock for over a century. Milling technology can be separated into crushing and impact technology.

The most common crushing size reduction technology is the roller mill. Roller mills have been investigated for the purpose of destroying weed seeds at harvest time. Roy and Bailey (1969) U.S. Pat. No. 3,448,933 describe a roller shear mill for destroying weed seeds out of clean grain screenings. Reyenga (1991) U.S. Pat. No. 5,059,154 describes using a separating device and roller mill to crush foreign matter such as weed seeds. A limitation of the roller mill is the ability to handle the bulk of residue material that contains the weed seeds and thus rely on a separation means to reduce the residue material.

Impact mills use high impact speeds generated by rotating elements to pulverise material. Impact mills have also been of interest for the destruction of weed seeds at harvest.

A widely used type of impact mill is a hammer mill, which uses a rotor with impact elements to pulverise material and a screen to classify the output size distribution. Hammer mills are highly versatile and can accept a wide range of feed materials. Plant material such as crop residues is fibrous and difficult to process. The use of hammer mills to devitalise weed seeds in crop residues has been well documented. The use of hammer mills onboard a harvester to devitalise weed seeds has been subject of multiple patents (e.g. Wallis (1995) AU1996071759 Bernard (1998) FR2776468B1).

An advantage of hammer mills is that in addition to impact, they induce crushing, shear and attrition forces that make them particularly useful for size reduction of fibrous materials. Another advantage of hammer mills is that they often have flexible impact elements that are replaceable and can handle some foreign objects without damage.

A further advantage of the hammer mill is that the screen size controls particle fineness and can then control the proportion of weed devitalisation. Control of output size distribution is particularly valuable in the processing of crop residues where material type and moisture conditions change significantly. Change in material conditions result in still similar output size distribution and weed material processing remains less dependent on material conditions than would be without the use of screens.

A disadvantage of current hammer mills is that the screen which controls particle size distribution determines throughput capacity. In general, to devitalise weed seeds a small screen size is required and hence throughput capacity is limited. A hammer mill with concentric screens of varying sizes has been described by Emmanouilidis (1951) U.S. Pat. No. 2,557,865. The Emmanouilidis mill has a central impact zone and additional screens are used to separate output material into different size fractions. The inner primary zone in the Emmanouilidis mill still dictates capacity and overall size reduction.

A different type of impact mill is a cage mill. A cage mill applies predominantly impact forces and level of size reduction is set through rotational speed and the number of concentric rows of bars. There is no classification of particle size with a cage mill. The impact forces in a cage mill make them suitable for friable or brittle materials and are not widely used for processing fibrous materials. However, one example is described in AU 2001/038781 (Zani) which is proposed for destruction of weed seeds. The Zani cage mill has concentric rows of impact elements supported by a ring. The mill is driven at high impact speed to destroy weed seeds. The arrangement can be neatly integrated into the harvester. The arrangement however has limited capacity and cannot process the entire chaff residue fraction exiting the harvesters sieve. Therefore, the Zani system relies on sieving to concentrate the weed seeds for processing.

An increased capacity cage mill is described in WO 2009/100500 (Harrington) to handle the whole chaff material fraction to destroy weed seeds. The Harrington mill uses a large counter rotating cage mill that has fan blades similar to Tjumanok et al 1989 (U.S. Pat. No. 4,813,619) to increase airflow and capacity. This cage mill is large, heavy, requires a complex counter rotating drive and requires considerable power to operate. The system has its own power package and is towed behind the grain harvester. The size, weight and drive, limits options to integrate the cage mill into the harvester. The mill incorporates cylindrical bars that limit impact speeds because of glancing blows. The impact speed therefore has a large distribution. To get sufficient impact energy into weed seeds requires counter rotation of the cage structures.

The current state of the art for seed destroying mill technology is described in PCT/AU2014/218502 (Berry Saunders). Berry Saunders uses a rotor stator cage mill that is much simpler to integrate into a grain harvester than the counter rotation systems. The Berry Saunders mill provides an advance on the Zani cage mill by improving the throughput capacity and seed kill performance of the mill system. It achieves this by using a central distribution element (also described in Isaak (2003) DE 10203502) and angular static bars that are slanted against the rotation of the rotor. A purportedly novel aspect of the Berry Saunders mill is that the spacing between the angled impact bars determines if a seed will pass through to the next row of impact bars or stay within the current row of impact bars. The size of the seed does not determine if it passes through the row of impact bars or remains.

The relatively simple workings of cage mills which apply predominantly impact and do not use size classification has enabled computer modelling techniques to be used to predict mill performance. The Berry Saunders mill has been optimised using computer modelling techniques to apply the ideal requirements to devitalise weed seeds using impact alone. However, there has been little concern for the airflow component of the power consumption. The rotor bars are narrow with sharp edges resulting in high drag coefficient and turbulence generation. The stator bars are orientated to result in torque converter or water brake dynamometer like turbulence generation and wasted heat generation.

One disadvantage of this approach is that the stator impact bars take up a lot of space radially. This in turns means that adjacent rows of rotating impact bars are spaced a long way apart. For a weed seed devitalisation mill, or a particle destruction mill for that matter, impact speed is crucial. When impact bars are spaced widely apart the impact speed difference between each subsequent row is significant.

The above references to the background art do not constitute an admission that the art forms a part of the common general knowledge of a person of ordinary skill in the art. The above references are also not intended to limit the application of the material processing barrel and associated material processing system as disclosed herein.

SUMMARY OF THE DISCLOSURE

A general idea of the disclosed barrel and corresponding processing system is to facilitate the processing of material by subjecting the material to a plurality of impacts against an inner surface of a barrel like structure by the action of an impact mechanism rotates that about an axis of the barrel. This creates a spiral flow path of the material between an inlet opening and an outlet opening that are formed in the inner surface and spaced along the axis. The spiral flow path is longer than the axial distance between the inlet opening an outlet opening thereby providing an effective increase in impact surface area for the material.

A further idea of at least one embodiment of the disclosed barrel structure is to form its inner surface with a configuration that, for a material containing two or more types of constituents, differentially processes the different constituents. The difference in processing may arise for example from a difference in the density of the constituents, or their particle size or particle shape.

One particular application for the barrel and corresponding system is in agriculture and in particular the devitalisation of weed seeds during harvesting. In such an application the barrel and system can operate to effect one or more of: particle size reduction, fragmentation, fracturing, crushing and milling.

In one aspect there is disclosed a barrel for a material processing system comprising:

- a barrel like structure having a circumferential wall with an inner impact surface extending circumferentially about a central axis of the barrel-like structure, at least one inlet to the barrel-like structure and at least one outlet from the barrel-like structure, the inlet and the outlet being spaced along the axis.

In one embodiment the impact surface is configured to guide, or otherwise induce motion of, the material entering through the at least one inlet to travel in a spiral path about the axis toward the at least one outlet.

In one embodiment the impact surface is a textured surface formed with a plurality of valleys or protrusions or both valley and protrusions.

In one embodiment the valleys or protrusions lie in an oblique orientation with reference to the central axis.

In one embodiment the at least one inlet and the at least one outlet comprise: (a) respective inlets located at or near opposite axial ends of the barrel like structure, and an outlet located between respective inlets; or, (b) respective outlets located at or near opposite axial ends of the barrel like structure, and an inlet located between the respective outlets.

In one embodiment the valleys or protrusions are arranged in first and second sets, wherein the valleys or protrusions in the first set extend from or near a first of the axial ends toward a central radial plane of the barrel like structure and the valleys or protrusions in the second set extend from or near a second of the axial ends toward the central radial plane.

In one embodiment the valleys or protrusions in the first and second sets are symmetrically orientated about the central radial plane.

In one embodiment the barrel comprises an aperture mechanism located between one of the inlets and one of the outlets, the aperture mechanism arranged to enable control of a flow of material between the one of the inlets and one of the outlets.

In one embodiment the aperture mechanism is one of a set of a plurality of interchangeable aperture mechanisms wherein at least two sets of the interchangeable aperture mechanisms have a mutually different aperture area.

In one embodiment the aperture mechanism comprises a central opening having a user selectable area.

In one embodiment the barrel comprises one or more screens located across the at least one outlet.

In one embodiment the barrel comprises one or more louvers located in or across the at least one outlet and operable for varying an effect open area of the at least one outlet.

In one embodiment the barrel like structure comprises a plurality of a plurality of circumferential segments demountably coupled together along the central axis, each segment having a circumferential wall portion with an inner impact surface portion; wherein the circumferential wall portions of the segments together form the circumferential wall of the barrel like structure, and the inner impact surface portions of the segments together form with the impact surface of the barrel like structure.

In a second aspect there is disclosed a barrel for a material processing system comprising:

- a plurality of circumferential segments capable of being demountably coupled together along the common central axis, each segment having a circumferential wall with an inner impact surface, and wherein the circumferential wall of at least two of the segments are provided with openings to form at least one inlet and at least one outlet which are spaced from each along the central axis.

In one embodiment respective segments provided with openings are located at each axial end of the barrel.

In one embodiment at least one further segment provided with an opening is located between the axial ends of the barrel.

In one embodiment either (a) the openings located at the axial ends are both inlets enabling material to enter the barrel, and the opening of the at least one further segment is an outlet through which material can exit the barrel; or, (b) the openings located at the axial ends are both outlets enabling material to exit the barrel, and the opening of the at least one further segment is an inlet enabling material to enter the barrel.

In one embodiment the openings comprise a combination of one or more inlets for material to enter the barrel and one or more outlets to allow material to exit the barrel or an outlet.

In one embodiment each circumferential wall provided with an opening comprises an inner impact surface that extends continuously in a circumferential direction between opposite axial edges defining the opening.

In one embodiment wherein the inner impact surface for each circumferential wall provided with an opening extends for at least 180° about the central axis.

In one embodiment the barrel comprises an aperture mechanism located between two mutually adjacent segments, the aperture mechanism arranged to enable control of a flow of material between the mutually adjacent segments.

In one embodiment the aperture mechanism is one of a set of a plurality of interchangeable aperture mechanisms wherein at least two sets of the interchangeable aperture mechanisms have a mutually different aperture area.

In one embodiment the aperture mechanism comprises a central opening having a user selectable area.

In one embodiment the barrel comprises one or more screens located across the outlets.

In one embodiment the barrel comprises one or more louvers located in or across the outlets and operable for varying an effect open area of the outlets.

In one embodiment the impact surface is an impervious textured surface formed with a plurality of valleys or protrusions or both valley and protrusions.

In one embodiment the valleys or protrusions are arranged in first and second sets, wherein the valleys or protrusions in the first set extend from or near a first of the axial ends toward a central radial plane of the barrel and the valleys or protrusions in the second set extend from or near a second of the axial ends toward the central radial plane.

In one embodiment the valleys or protrusions lie in an oblique orientation with reference to the central axis.

In one embodiment the valleys or protrusions in the first and second sets are symmetrically orientated about the central radial plane.

In a third aspect there is disclosed a material processing system comprising:

- a barrel like structure having a circumferential wall with an inner impact surface extending circumferentially about a central axis of the barrel-like structure, at least one inlet to the barrel-like structure and at least one outlet from the barrel-like structure, the inlet and the outlet being spaced along the axis;
- an impact mechanism rotatably supported to rotate about the central axis, the impact mechanism arranged to impact material entering the barrel and accelerate the material to impact the impact surface; and
- one or more spiral flow mechanisms arranged to induce motion of the material entering through the at least one inlet to travel in a spiral path about the axis toward the at least one outlet.

In one embodiment the one or more spiral flow mechanisms includes one or protrusions or valleys formed on the impact surface that follow a spiral path or a path that is that is inclined or otherwise oblique, with reference to the central axis.

In one embodiment the one or more spiral flow mechanisms includes vanes or fins which are supported on and extend radially inward from the impact surface.

In one embodiment the impact mechanism comprises a shaft and a plurality of hammers extending from the shaft; and wherein the one or more spiral flow mechanisms includes: grooves or ribs that follow a twisted path; or vanes or fins; on the shaft.

In one embodiment the spiral flow mechanism includes configuration and/or angle of the hammers.

In a fourth aspect there is disclosed a material processing system comprising:

- a barrel according to the first or second aspect; and
- an impact mechanism rotatably supported to rotate about the central axis, the impact mechanism arranged to impact material entering the barrel and accelerate the material to impact the impact surface.

In one embodiment the impact mechanism comprises a shaft and a plurality of hammers coupled to the shaft.

In one embodiment at least two of the hammers are axially displaced relative to each other.

In one embodiment the hammers are pivotally or otherwise flexibly coupled to the shaft enabling a swinging motion or deflection of the hammers in a radial plane.

In one embodiment at least some hammers are located near an inlet and are curved in a direction forward of a direction of rotation of the shaft.

In one embodiment at least some hammers are located at or near the outlet and are curved in a direction rearward of a direction of rotation of the shaft.

In a fifth aspect there is disclosed a material processing system comprising: first and second barrels each according to the first or second aspects; and a respective impact mechanism for each of the barrels, the impact mechanisms rotatably supported to rotate about the central axis of a corresponding barrel and arranged to impact material entering the corresponding barrel and accelerate the material to impact the impact surface of the corresponding barrel; the first and second barrels being juxtaposed so that material exiting the at least one outlet of one barrel is arranged to feed into the at least one inlet of the second barrel.

In a sixth aspect there is disclosed a material processing system comprising:

- a barrel having an interior impact surface, a central axis, and opposite axial ends; an impact mechanism capable of rotating about the central axis of the barrel, the impact mechanism and barrel cooperating to process the material by impacting the material to effect one or more of particle size reduction, fragmentation, fracturing, crushing and milling;
- at least two first openings and at least one second opening, wherein there is a first opening at each of the opposite axial ends and at least one second opening formed in the barrel between the opposite axial ends; and
- wherein each of the at least two first openings is either: (a) an inlet enabling material to enter the barrel; or, (b) an outlet enabling processed material to exit the barrel, and each of the at least one second openings is the other of an inlet and an outlet.

In a seventh aspect there is disclosed a material processing system comprising:

- a barrel having an impact surface, a central axis, and opposite axial ends;
- an impact mechanism capable of rotating about the central axis of the barrel;
- first and second openings located one at each of the opposite axial ends; and
- at least one third opening formed in the barrel and located intermediate of the first and second openings;
- wherein the first and second openings are either inlets or outlets; and the at least one third opening is the other of the inlet and outlet.

In one embodiment the impact surface is a textured surface formed with a plurality of valleys or protrusions of both valley and protrusions.

In one embodiment the valleys or protrusions are arranged in first and second sets, wherein the valleys or protrusions in the first set extend from or near first of the axial ends toward a central radial plane of the barrel and the valleys or protrusions in the second set extend from or near a second of the axial ends toward the central radial plane.

In one embodiment the valleys or protrusions lie in an oblique orientation with reference to the central axis.

In one embodiment the valleys or protrusions in the first and second sets are symmetrically orientated about the central radial plane.

In one embodiment the system comprises one or more louvers located in or across each outlet and operable for varying an effective open area of the outlet.

In one embodiment the system comprises a material distributor arranged to direct material entering the barrel toward the inlets.

In one embodiment the impact mechanism comprises a shaft and a plurality of hammers coupled to the shaft.

In one embodiment at least two of the hammers are axially displaced relative to each other along the shaft.

In one embodiment the hammers are pivotally or otherwise flexibly coupled to the shaft enabling a swinging motion or deflection in a radial plane.

In one embodiment at least some hammers are located near an inlet and are curved in a direction forward of a direction of rotation of the shaft.

In one embodiment at least some hammers are located at or near the outlet and are curved in a direction rearward of a direction of rotation of the shaft.

In an eighth aspect there is disclosed a combine comprising a material processing system according to any one of the third to seventh aspects wherein the material processing system is mounted on the combine with the central axis orientated horizontally and at a location to receive a feed of chaff, the material processing system being operable to process the chaff.

In a ninth aspect there is disclosed a material processing system comprising:

- a barrel having an inner surface, a central axis, and opposite axial ends;
- an impact mechanism capable of rotating about the central axis of the barrel;
- first and second openings formed in the barrel and spaced axially from each other, wherein material is able to enter the barrel through one of the first and second openings and wherein when the impact mechanism is rotating, at least some the material is processed by being impacted by the impact mechanism and/or against the inner surface and transported by action of the impact mechanism in a spiral path about the central axis to and discharged from the other of the first and second openings.

In one embodiment the system comprises a third opening located intermediate the first and second openings wherein either the first and second openings are inlets and the third opening is an outlet, or the first and second openings are outlets and the third opening is an inlet.

In one embodiment the barrel comprises a plurality of annular segments coupled together in mutual coaxial alignment.

BRIEF DESCRIPTION OF THE DRAWINGS

Notwithstanding any other forms which may fall within the scope of the material processing barrel and associated material processing system as set forth in the Summary, specific embodiments will now be described, by way of example only, with reference to becoming drawings in which:

FIG. 10 is a schematic representation of a possible configuration of an impact surface of a second embodiment of the disclosed barrel when the impact surface is laid flat;

FIG. 11 is a view of section AA of FIG. 10;

FIG. 12 is an enlarged view of a portion of the impact surface shown in FIG. 10;

FIG. 13 is a photographic representation of a constructed prototype of the disclosed system with a barrel having an impact surface as represented in FIGS. 10-12;

DETAILED DESCRIPTION OF SPECIFIC EMBODIMENTS

Figure 1:
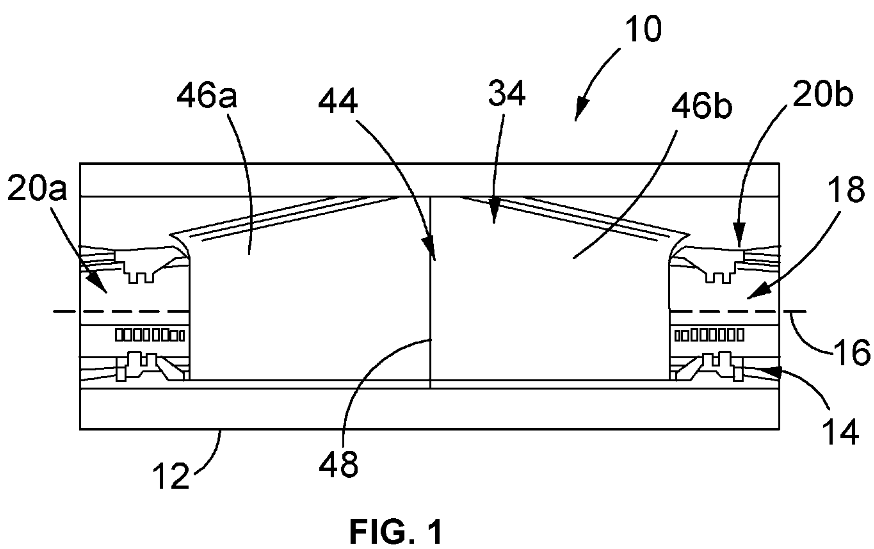
FIG. 1 is a schematic representation of a first embodiment of the disclosed barrel and associated system looking in from an inlet chute onto a distributor which feeds material to inlets at each end of a barrel of the system.

The following description of the embodiments of the disclosed material processing system 10 (hereinafter also referred to as "system 10) and associated barrel 12 are made in the context of an agricultural application where the system 10 is mounted on a combine harvester for processing chaff and in particular devitalising seeds (for example, but not limited to weed seeds) in chaffs. For a crop harvested by a combine harvester the chaff may typically comprise a combination of small portions of straw, target grain husks and seeds from weeds or volunteers.

With reference to the accompanying drawings an embodiment of the disclosed system 10 comprises a material processing barrel like structure or body 12 (also referred to hereinafter more simply as "barrel 12") having a milling or impact surface 14 and a central axis 16. The impact surface 14 is impervious, in that material cannot pass through the surface 14, but rather is contained by the surface. An impact mechanism 18 is located within barrel and is capable of rotating about the central axis 16. In a broadest and most general embodiment the system 10 has at least two openings, one forming an inlet and the other forming an outlet. The openings are spaced along the axis 16. As explained in more detail later, material processed by the system 10 is caused to travel in a spiral path along the axis 16 when flowing from an inlet to an outlet. The openings, be they inlets or outlets may be at axial ends of the barrel 12 or, as shown in the present embodiment, formed in the circumferential surface of the barrel 12.

Various mechanisms may be used either separately or in any combination of two or more to induce the spiral flow path of the material (and air in which the material is entrained) from an inlet to an outlet. These mechanisms can include:

- protrusions 24 such as ribs or rasp bars that are incorporated in the impact surface 14;
- vanes or fins which are supported on and extend radially inward from the impact surface 14;
- longitudinal grooves or ribs that follow a twisted path; or by the attachment of vanes or fins; on a shaft 52 of the impact mechanism 18;
- the configuration and/or angle of hammers 54 incorporated in the impact mechanism 18.

In the embodiment illustrated in FIGS. 1-9 the system 10 has openings 20*a* and 20*b* formed in the barrel 12 (i.e. in the surface 14) at axially spaced locations along the axis 16. In this example the openings 20*a* and 20*b* are at opposite axial ends of the barrel 12. In this, but not all embodiments, the openings act as or form inlets and are hereinafter referred to in general as "inlet(s) 20". At least one further opening 22 is formed in the barrel 12 at a location intermediate of the inlets 20 (i.e. between the opposite axial ends of the barrel 12). In this embodiment the opening 22 is an outlet and is hereinafter referred as "outlet 22".

In this embodiment the impact surface is an impervious impact surface 14. This surface is a textured surface. The texturing can take many forms such as a plurality of surface reliefs such as surface valleys, pits or grooves and/or surface elevations such as ridges, ribs, bumps, protrusions and projections; or other irregularities. In this embodiment and as seen most clearly from FIGS. 3-6 the texturing of the impact surface 14 comprises a plurality alternating protrusions or ridges 24 and valleys 26. The alternating arrangement is in the circumferential direction of the barrel 12, i.e. about the central axis 16.

Figure 2:
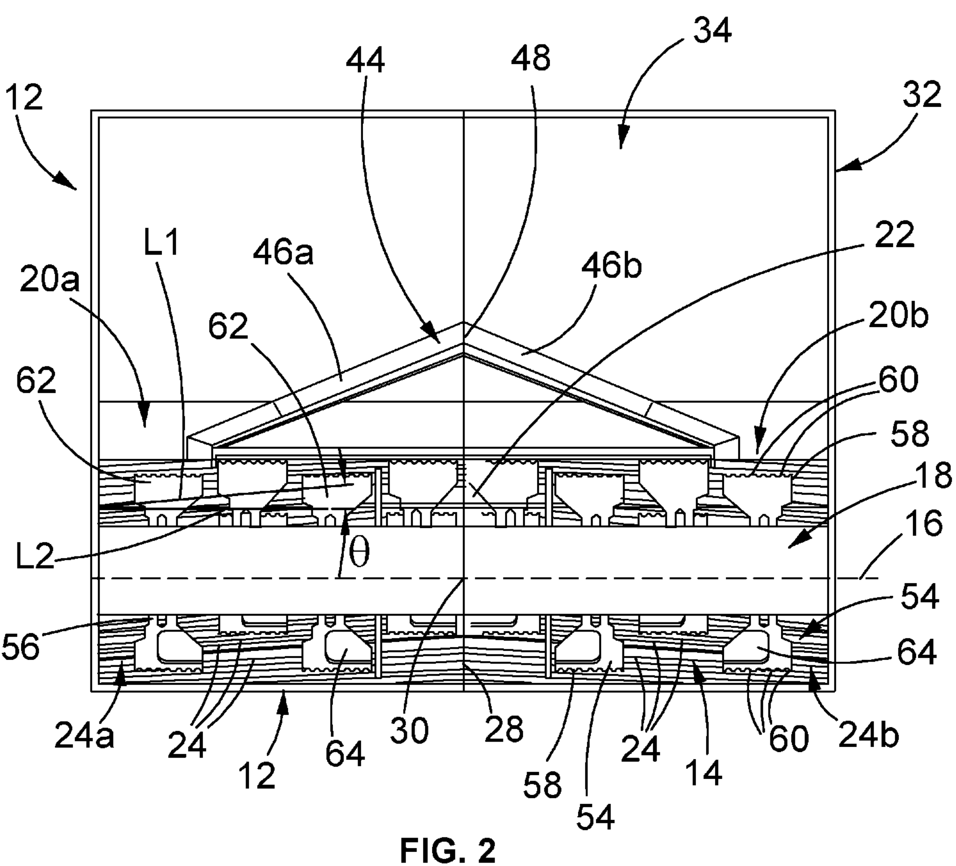
FIG. 2 is a schematic representation of a section of the barrel and system taken through a plane which includes a central axis of the barrel.
Figure 3:
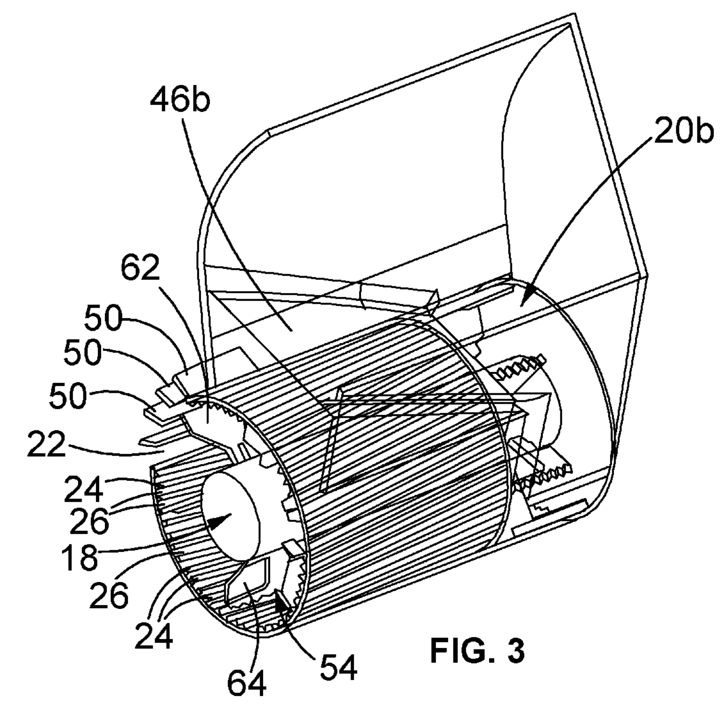
FIG. 3 is a schematic see-through representation of a portion of the barrel and system including a part of the distributor, the barrel and an impact mechanism incorporated in the system.

In this embodiment the protrusions 24 are in the form of ribs, hereinafter referred to as "ribs 24". With reference to FIG. 2 the ribs 24 are arranged in two sets of ribs 24*a* and 24*b*. The ribs 24 in the first set 24*a* extend from or near the first inlet 20*a* toward a mid transverse plane 28 of the barrel 12 that passes through a midpoint 30 of, and lies transverse to the central axis 16. The ribs 24 in the second set of ribs 24*b* extend from or near the second inlet 20*b* toward the mid plane 28. In this, but not all embodiments, the ribs 24 lie in an oblique orientation with reference to the central axis 16. The sets of ribs 24*a* and 24*b* are symmetrical in terms of their orientation about the mid plane 28.

In a general sense, the protrusions 24 flow path (a) is inclined or oblique relative to the central axis 16 or (b) otherwise follows a spiral like path about the axis 16. However, in this specific embodiment and as shown in FIG. 2 each of the ribs 24 extends in a continuous straight line L1 from its respective inlet 20 to the mid plane 28. In this embodiment the ribs 24 (i.e. line L1) run at an included angle θ with reference to an axial line L2 on the impact surface 14 of about 5°-15°. However, in other embodiments the ribs 24 may be made to run at a different angle to change the residence time of material within the system 10. The varying of the angle of the ribs 24 can be manual by way of a swap out of the surfaces in the barrel; or by having ribs 24 that are movably coupled to enable their angle to the axis 16 to be varied by actuators (e.g. linear actuators). The actuators may be controlled from the combine cab. Optimal processing by automatically adjusting actuators control system and machine learning may be implemented. This may be mechanically simple for later described embodiments of the barrel and system in which the barrel is composed of a plurality of separate segments 70.

Figures 7, 8, 9:
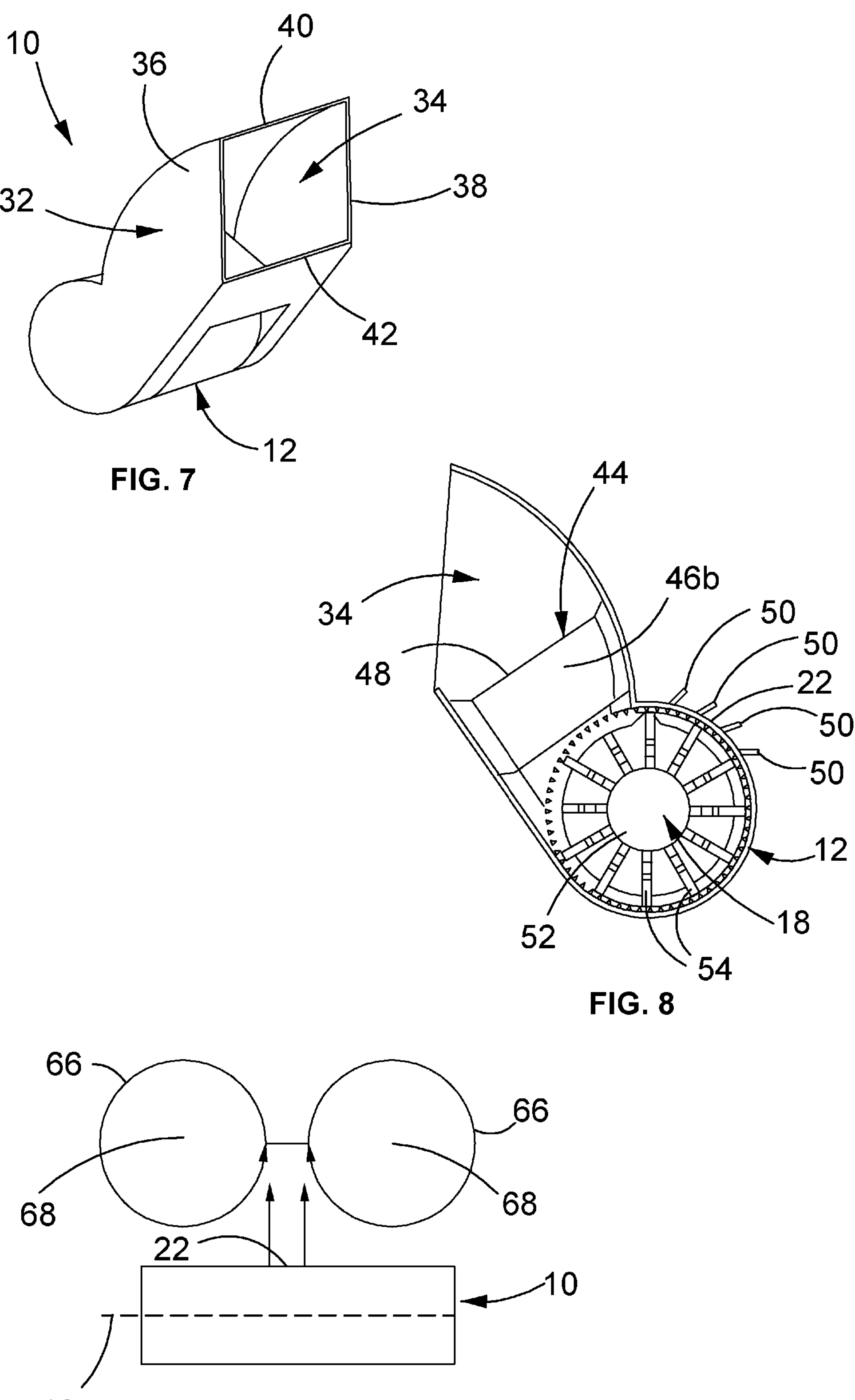
FIG. 7 is a representation of a housing of the system.
FIG. 8 is a transverse section view of the system.
FIG. 9 illustrates a possible relationship between embodiments of the disclosed system and spinners for spreading the discharge of the system when mounted on a combine harvester.
Figure 14:
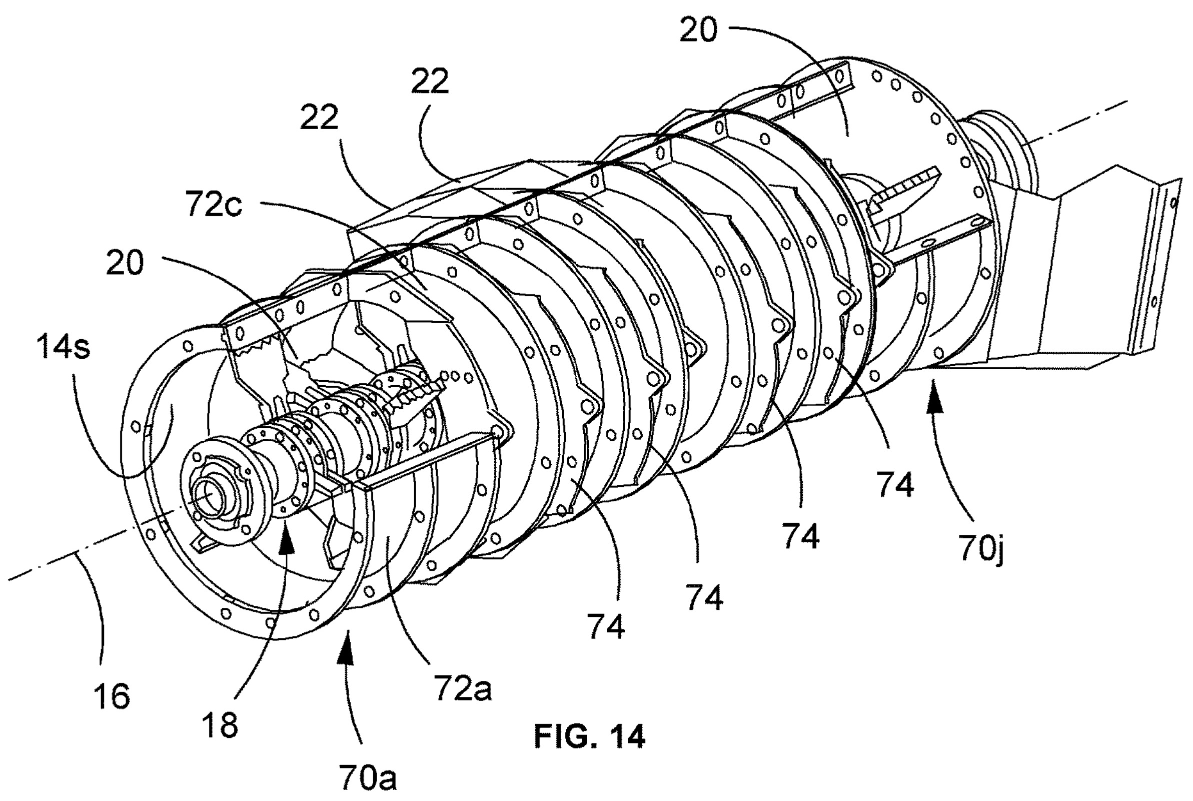
FIG. 14 is a schematic representation of a third embodiment of a barrel that may be incorporated in a hammer system.

The system 10 has a housing 32 which includes the barrel 12. Perhaps as best seen in FIG. 7 the housing 32 has an inlet chute 34. The inlet chute 34 is formed between opposite side walls 36 and 38, and opposite top and bottom walls 40 and 42 of the housing 32. Within the inlet chute 34 there is a distributor 44 for feeding material entering the inlet chute 34 to each of the inlets 20. The distributor 44 feeds substantially equal amounts of material to each of the inlets 20*a* and 20*b*, assuming a uniform feed across the inlet chute 34. This is achieved by forming the distributor 44 with respective slide or ramp surfaces 46*a* and 46*b* (hereinafter referred to in general as "slide surfaces 46") which are declined from a common ridge 48 that is aligned with the mid plane 28 and midpoint 30.

The outlet 22 is formed as a cut out or removed portion of the barrel 12. The outlet 22 is symmetrical about the mid plane 28. The circumferential extent of the outlet 22 may range between about 30° and about 90°. One or more louvers or gates 50 may be provided in the outlet 22. The louvers 50 may be located in or across the outlet 22 and are operable to vary or control the open area of the outlet 22. Specifically, the louvres 50 may be swung between a fully open position where they extend in respective radial planes with reference to the axis 16, to a fully closed position where the louvres 50 lie substantially tangentially to a radius from the central axis 16. Varying the position of the louvres 50 has the effect of varying the outlet area of the outlet 22. This in turn can be used as one mechanism to vary residence time of the material in the system 10.

The outlet 22 can be located anywhere about the outer circumference of the barrel 12. The location of the outlet 22 may be determined by the nature of the machine to which the system 10 is fitted including the relative position of the system 10 and a downstream system or mechanism to which the output of the system 10 is fed, for example a chaff spreader, tail board, or a straw chopper. For example, if it is desired to feed the output of the system 10 to a straw chopper from a location where the inlet of the straw chopper is about level with the bottom of a horizontally orientated system 10, then the outlet 22 may be formed to extend across a 60° arc from say about the 4 o'clock to the 6 o'clock position around the rotation axis 16. In another example where say a horizontally installed system 10 is required to feed its output to a chaff spreader or a straw chopper with an inlet located vertically above the axis 18 then the outlet 22 may be formed to extend across about 60° from about the 12 o'clock position to the 2 o'clock position. The louvres 50 and/or cowlings 23 (described later) may also be used to assist in directing the output of the system 10 is required.

The impact mechanism 18 comprises a central shaft 52 and a plurality of hammers 54 that are coupled to and extended generally radially of the central shaft 52. The shaft 52 may also be arranged to induce an axial motion of the material and air flowing through the barrel 12. This may be achieved for example by profiling the outer circumferential surface of the shaft 52 for example: with longitudinal grooves or ribs that follow a twisted path; or by the attachment of blades or fins which are profiled to induce material and air flow in a desired direction for example from the inlets to the outlet.

Each hammer 54 has an arm 56 that may be pivotally or otherwise flexibly coupled to the shaft 52. In this way the hammers act as flails. In the event of such coupling the hammers 54 are able to swing, deflect or otherwise provide a degree of give in a radial plane if impacted by a hard foreign object within the mill. The purpose of this is to help reduce the risk of major damage to the hammers 54 and the system 10.

Each hammer 54 has a radially outer edge 58 located with a small clearance from the impact/milling surface 14. The edge 58 is formed with a plurality of spaced apart grooves or flutes 60. The purpose of the flutes 60 is to assist in fragmenting elongated material such as straw that may enter system 10 from the inlets 20 and reducing smearing of material on the impact surface 14. Additionally, the flutes 60 may have a combing effect on straw contained in the chaff and thus further assist in creating a differential in motion and/or processing of the straw in comparison to weed seeds contained in the chaff. In this embodiment an impact side 62 of the hammers 54 is substantially planar and lies in an axial plane. A trailing face 64 of the hammers is scalloped. The purpose of this is to balance the impact mechanism 18. In the absence of the scalloping the centre of gravity of the hammers 54 would be offset from the centre of gravity of the shaft 52 which may lead to instability together with increased bearing wear and heat generation.

The hammers 54 are distributed about the shaft 52 both circumferentially and axially. Thus at least two of the hammers are axially displaced relative to each other along the shaft. Many different distribution patterns for the hammers 54 are possible. For example, the hammers may be arranged in rings having the same number of hammers 54 (for example 6 hammers in each ring) where the hammers in each ring are evenly spaced circumferentially about the shaft 52 and the hammers in axially adjacent rings are axially aligned with each other. However, in another embodiment the hammers can be arranged in rings as in the previous example but where the hammers in axially adjacent rings are circumferentially offset from each other. In yet a further alternative the hammers may be arranged in a spiral path from one end of the shaft 52 to the other.

In yet a further variation the hammers 54 may be rigidly fixed to the central hub rather than pivotally coupled. Also, the hammers may be formed to have a single arm rather than the illustrated bifurcated arm; and/or have simple planar faces on opposite sides. The radially outer axial edge of the hammers can also be formed with a simple straight edge rather than with the flutes 60.

The general operation of the system 10 is as follows. The system 10 may be conveniently mounted on a combine harvester near an end of a grain sieve, with the axis 16 orientated horizontally. The function of the grain sieve is to separate a target grain from chaff. The target grain may fall into a sump and then be moved for example with an auger to a storage bin. The remaining chaff progresses toward the end of the sieve from which it feeds into the inlet chute 34 of the disclosed system 10. (In the absence of the, or another, mill the chaff from the grain sieve would ordinarily feed into a chaff spreader.)

Some of the chaff near the inside of the side walls 36 and 38 may fall directly into the inlets **20*a*, 20*b*. The remaining chaff falls onto the distributor 44 which then feeds that chaff to the inlets 20*a* and 20*b* of the barrel 12. The chaff in the barrel is processed by way of being impacted by the hammers 54 and accelerated toward and onto the impact surface 14. The material impacted by the hammers and accelerated onto the impact surface 14** is fragmented. Weed seeds contained within the chaff are also fragmented and devitalised.

The material entering the barrel 12 from the inlets 20 may be transported toward the outlet 22 by one or both of two actions of the system 10. One of these is a pressure differential created by the rotation of the hammers 54 about the axis 16. This rotation increases air pressure within the barrel with reference to ambient pressure. Provided the outlet 22 is open to at least some extent the outlet 22 forms a low-pressure area within the barrel 12. Accordingly, the system 10 generates an air flow from the inlets to the central outlet 22 which entrains the material being milled. A second of these actions arises by configuring the impact surface 14 to guide, or otherwise induce motion of, the material entering through an inlet 20 to travel in a spiral path about the axis 16 toward an outlet 22. In this embodiment this is achieved by way of the configuration of the protrusions/ribs 24. The angling of the ribs 24 with reference to the axis 16 together with the rotation of the hammers 54 creates a screw like or auger effect assisting to move the material in a spiral flow path about the axis 16 toward the outlet 22.

As indicated above different embodiments of the system 10 can be provided with ribs 24 with different angles of inclination θ to adjust residence time within the system 10 and thus vary the degree of fragmentation and particle size reduction. In terms of the spiral flow path, changing the angle θ changes the induced axial component of the material velocity so that the spiral path between an inlet and an outlet can be changed. For example, increasing the angle θ increases the induced axial component to reduce the inlet to outlet distance and therefore decrease residence time. This may also be looked at from the perspective of the effective contact area of the material with the impact surface increasing hence the increased processing i.e. fragmentation/devitalisation of the weed seeds.

The angles of inclination θ can be actively varied by way of actuators controlled for a cab of a combine. This requires that the ribs 24 are coupled with the body of the barrel 12 so that they can move in unison to vary the angle θ. This has the effect of changing the pitch of the spiral path about the axis 16 of the material and air.

The material discharged from the outlet 22 may be fed into two of spinners 66 (see FIG. 9) that rotate on respective vertical axes 68 that lie the same distance from the rotation axis 16 and on opposite sides of the outlet 22. The spinners 66 rotate in opposite directions to each other so that material discharged from the outlet 22 between the rotation axes 68 is carried further away from the outlet 22. The discharge from the outlet may alternately be directed into another device such as a straw chopper. In another application the discharge may be used to assist in spreading other material such as for straw spreading on a combine by directing the discharge onto a straw tailboard or into a straw spreader. In each of these alternate applications the airflow generated by the system 10 is used to augment to functionality of the device to, or into, which it is directed.

Figure 23A:
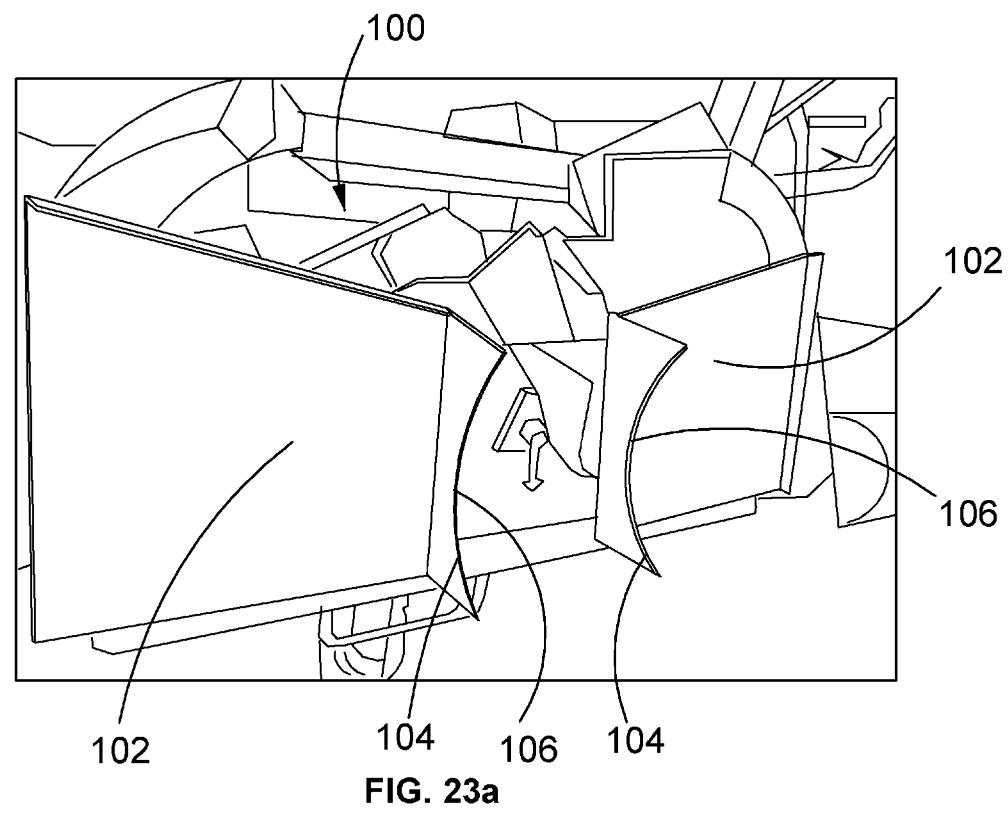
FIG. 23*a* is a photograph of a spreader on combine which has been modified by the addition of plates and shown in a raised position to accommodate an embodiment of the disclosed barrel and system.
Figure 23B:
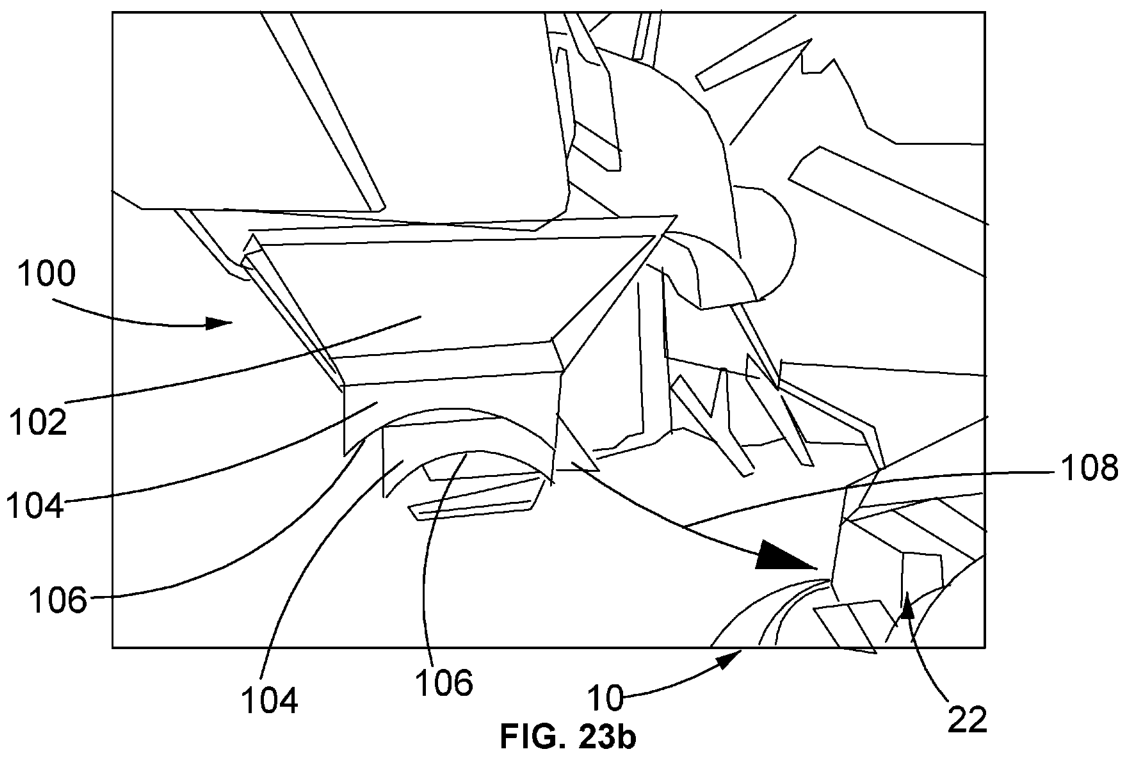
FIG. 23*b* is a photograph of spreader shown in FIG. 23*a* from an alternate angle but also showing an embodiment of the system which, when the spreader is lowered to its operational position, is able to feed its discharge into the modified spreader to enhance the performance of the spreader.

FIGS. 23*a* and 23*b* illustrate the integration of an embodiment of the system 10 with a spreader 100 on a CASE IH™ combine harvester. In FIG. 23*a* the spreader 100 as shown in a raised position. FIG. 23*b* also shows the spreader 100 in a raised position but from the side of the combine with the outlets 22 of the system 10 installed on the combine being visible. Here the spreader 100 has been modified by the installation of blanking plates 102 that span from opposite sides of the spreader toward its central region, and integral flanges 104. The flanges 104 are formed with arcuate edges 106 of a radius substantially the same as the outer radius of the barrel 12 and spread apart to locate about the outlets 22. When the spreader 100 is thus swung down into its operational position indicated by the arrow 108 the discharge from the outlets 22 is feed between the flanges 104 into the spreader 100. The inclusion of the blanking plates 102 with their integral flanges 104 assists in creating more wind/airflow and turbocharges the effect of the spreader 100.

The system 10 can be embodied in many different ways and may be subject to numerous modifications and variations without departing from the broad underlying structure and method of operation. For example, the barrel 12 may be fabricated by texturing a planar metallic surface and then rolling the surface into a barrel shape having a single seem that can be joined. In such construction an expandable or otherwise resilient axial joint can be formed so that the barrel 12 is provided with a degree of give and allow it to flex in a radial or circumferential direction. This may assist for example to pass a hard foreign object. This effect can be enhanced if the barrel is formed from two or more sectors which together when joined about a common axis form the barrel with expandable or resilient joints between each of the sectors.

One way of forming an expandable or resilient joint is to construct the barrel 12 from say two generally hemi-cylindrical parts, they can be coupled together to form a substantially cylindrical barrel like structure. Each of the parts may extend for a little more than 180° so that there is a degree of overlap. For example, each extends for 185° so that there is a 5° of overlap along opposite axial edges of the parts. The parts can be coupled together by a spring mechanism such as a pneumatic spring or a mechanical spring which will allow the parts to move radially away from each other against the bias of the spring.

In another variation of the system 10, the protrusions 24 of the impact surface 14 need not be in the form of straight ribs that extend the full length from an axial end of the barrel 12 to the mid plane 28. Rather the protrusions may be in the form of much shorter ribs which are spaced apart and arranged in a line from an end of the barrel 12 to the mid plane 28. In another example impact surface 14 may be textured with different surface effects that may include raised bumps, domes, plateaus or a plurality of valleys or recesses formed in an otherwise smooth circumferential surface as shown in FIGS. 10-13 as impact surface 14*t*. In yet another variation the protrusions 24 may be in the form of rasp bars coupled to the inner surface of the barrel 12. The rasp bars could have base which is flat or planar base, or alternately have a base that has a generally convex or triangular profile.

FIGS. 10-13 show the impact/milling surface 14*t* in a laid flat condition while FIG. 13 is a photographic presentation of a working porotype of the disclosed barrel system 10*t* with its barrel 12*t* formed with the textured impact surface 14*t*. The impact surface 14*t* in general terms is a surface having a plurality of surface reliefs such as surface valleys, pits or grooves and/or surface elevations such as ridges, ribs, bumps, protrusions and projections; or other irregularities. In this embodiment the impact surface 14*t* comprises a plurality of the valleys 128. At least some of the valleys 128 have two orthogonal axes 130 and 132 of unequal length. A shorter of the orthogonal axes 130 extend in a circumferential direction with respect to the rotation axis 16. A longer of the orthogonal axes 132 extends parallel to the rotation axis 16. Yet in other embodiments the axis 132 can be oblique to the axis of rotation 16. Having the axes 130 and 132 of unequal length provides the valleys 128 with a generally elliptical shape.

Between the valleys 128, the surface 14*t* as a plurality of lands 134 that are "flat" with respect to the axis of rotation 16 so that every point on the lands 134 lie on respective land radii of the same length. That is, if the surface 14*t* were laid out flat as indeed shown in FIGS. 10-12 all the lands 134 are flat and lay on a common plane. Also, the valleys 128 have edges 137 that lie on respective edge radii of the same length from the rotation axis. Thus, in this configuration the edges 137 all lie on the radii of the same length as those of the lands 134.

The valleys 128 are arranged in a generally uniform pattern of stacked circumferential rows R1, R2, R3, and R4. In rows R1-R3 the valleys 128 have respective axes 132 of the same length. However, in row R4 the valleys are of the shape of a hemi-ellipse and have a shorter axis 132. The number of rows of valleys on the surface 124 can vary. The ends of the valleys 128 in one row may, as they do in this embodiment, lie between the ends of adjacent valleys in an adjacent row.

When the impact surface 14*t* is used in relation to chaff it is believed that it may induce a differential flow of material depending on the material type in the chaff (for example short pieces of straw compared with weed seed) leading to different residence time within the mill. Without wishing to be bound by theory it is believed that straw pieces may flow along the lands 134 and across the edges 137 of the valleys 128, while weed seeds in the chaff may predominantly impact in the valleys 128. Consequently, it is believed that the seeds would travel more slowly and therefore have higher residence time within the impact sector than the straw pieces.

FIG. 13 show an example of a system 10*t* constructed with the barrel 12*t* having a milling surface 14*t* as describe in relation to FIGS. 10-12. The system 10*t* is also marked with the impact mechanism 18, hammers 54, valleys 128 and lands 134.

FIGS. 14-18 depict further embodiments of the system 10 with an alternate barrel 12*a* and show a possible method of construction.

The substantive difference between the barrel 12 of FIG. 1-9, and the barrel 12*a* in FIGS. 14-18 is that in the embodiment shown in FIGS. 14-18 (and indeed the barrel 12*t* shown in FIG. 13) the barrel 12*a* is composed of a plurality of circumferential segments 70*a*-70*j* (hereinafter referred to in general as "segments 70") capable of being demountably coupled together along the common central axis 16. Each segment 70 has a corresponding circumferential wall 72_a_-72_j_ (hereinafter referred to in general as "circumferential wall 72") with an inner impervious impact surface 14_s_. When the segments 70 are coupled together along the axis 16 the individual inner impervious impact surface 14_s_ of each segment 70 together form the impervious impact surface 14 of the barrel 12_a_. Also, the circumferential walls 72 of each of at least two of the segments is provided with openings 20 to form at least one inlet 20 and at least one outlet 22 spaced along the central axis.

Figure 15:
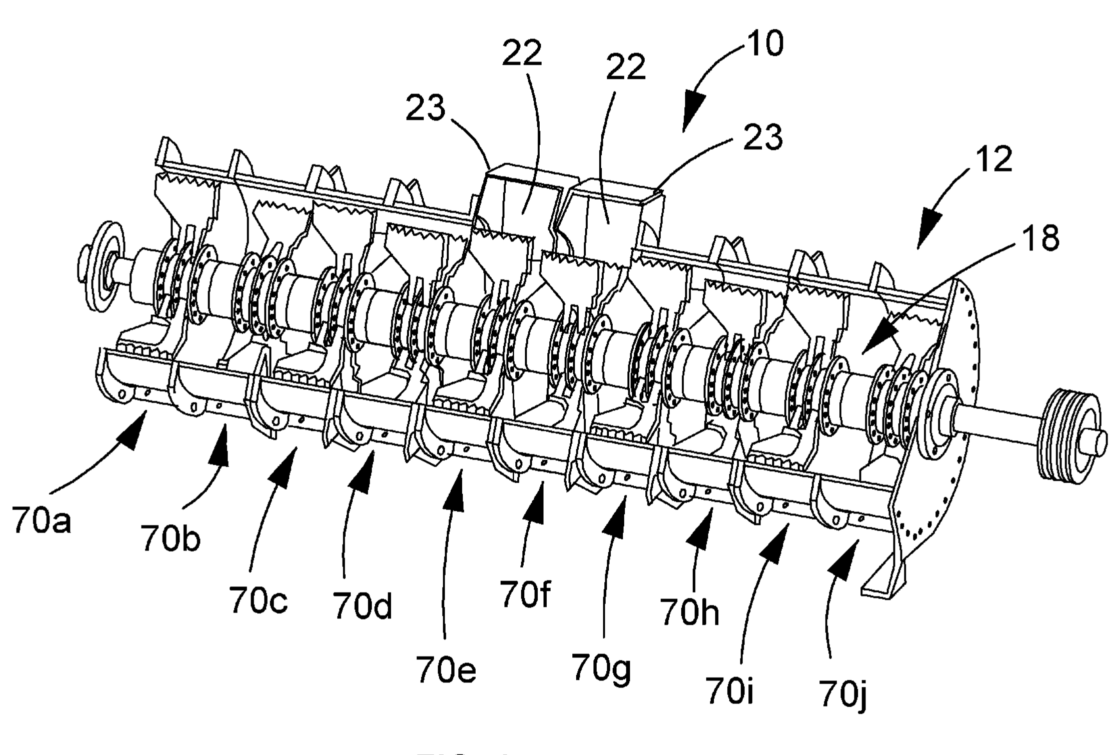
FIG. 15 is a section view of the barrel shown in FIG. 14.
Figure 16:
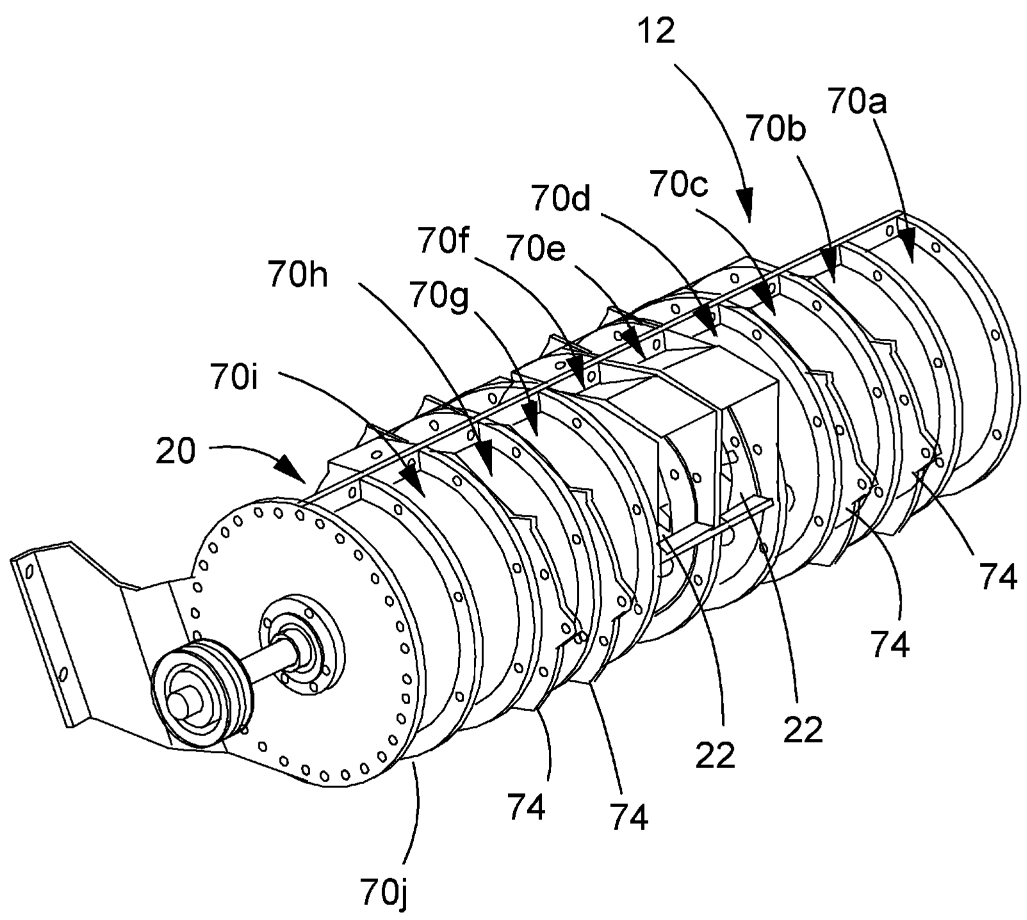
FIG. 16 is a schematic representation of the barrel shown in FIG. 14 but from an opposite angle.

In the embodiment shown in FIGS. 15 and 16 each of the segments 70 has the same axial length. The segments 70_a_ and 70_b_ are adjacent each other at one end of the barrel 12_a_ while the segments 70_i_ and 70_j_ are adjacent each other and at an opposite end of the barrel 12_a_. The respective circumferential wall 72 of segments 70_a_, 70_b_, 70_i_ and 70_j_ are formed with openings which, in this embodiment, form inlets 20 to the barrel 12_a_. Thus, openings (in this instance acting as inlets) are formed at each of the opposite axial ends of the barrel 12_a_.

The segments are 70_e_ and 70_f_ are located between the opposite axial ends of the barrel 12_a_. The respective circumferential walls 72_e_ and 72_f_ of these segments are formed with openings which act as outlets 22. The outlets are formed with respective fixed cowlings 23 instead of or in addition to the louvers 50 to assist in directing the processed material to a spinner or other device such as a chopper (not shown). The segments 70 may be formed as short cylinders or rings, and the openings, when provided, may be formed as a cut out or removed section of the cylinder or ring.

Figure 17:
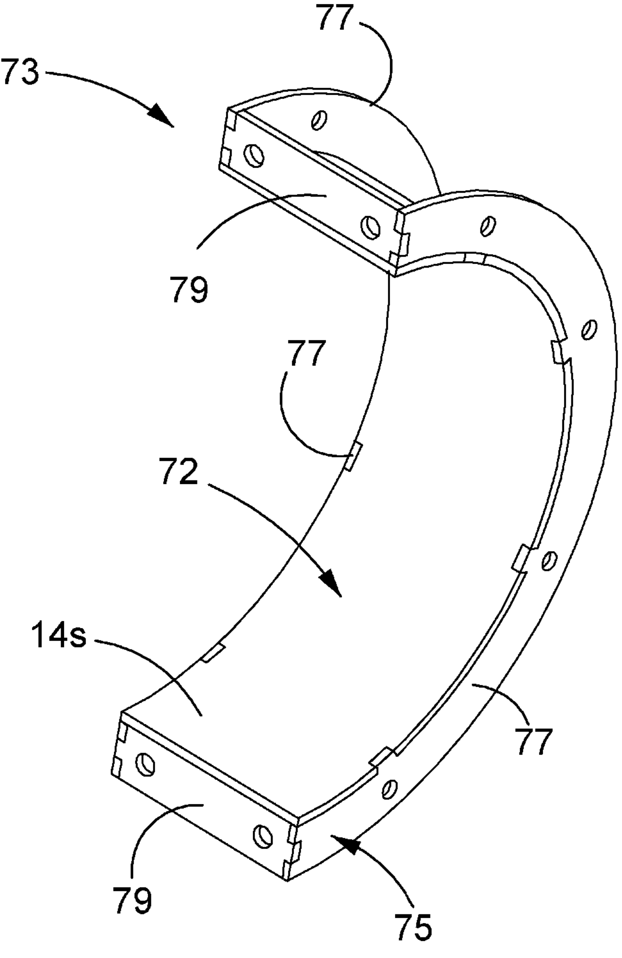
FIG. 17 is a representation of a section of a segment that may be used to construct the barrel depicted in FIGS. 14-16.

Alternately the circumferential walls 72 can be made from separate sections 73 (see FIG. 17) for example each extending for a fraction of 360° and which, when coupled together about a common axis form a full 360° ring. In FIG. 17 the section 73 extends for 180°. But in other embodiments this section 73 may extend for other angular portions such as 90°. It is also possible for a circumferential wall 72 to be composed of several sections 73 of different circumferential extent, for example one section of 180° and two additional sections of 90°; or, three sections of 90° and two sections of 45°. If a segment 70 is required with an opening having a circumferential extent of 90° and the corresponding circumferential wall 72 for the segments 70 may be formed of a 180° section and a 90° section only, leaving a 90° opening.

Each section 73 may have an associate supporting frame 75. The frame 75 may have radially extending curved flange portions 77 and axially extending flanges 79 extending between the flanges 77. The flanges 79 of two or more sections 73 (depending on their angular extend, e.g. 45°, or 60°, or 90°, or 180°) are connected together to form a segment 70. The flanges 77 of adjacent segments 70 are coupled together to form the barrel 12_a_.

In one variation flexible or resilient joints may be made between (a) each of the section 73 in a segment 70 and/or (b) adjacent segments 70 in the barrel 12. For example a rubber mount can be located between the flanges 79 of the section 73 making up a segment 70. Additionally, or alternately with amounts may be located between the flanges 77 of adjacent segments 70. The provision of the flexible or resilient joints provides the barrel 12 with a degree of flexibility in the axial and/or radial directions which may assist in the passing of a blockage or otherwise minimising the likelihood of damage due to the entrainment of a hard foreign object in the material being processed.

The circumferential wall 73 in one embodiment may be fixed to the frame 75. However, in an alternate embodiment the circumferential wall 73 may be demountable supported or movably supported within the frame 75. When demountable supported the circumferential wall 73 can be removed to thereby form an opening in the corresponding barrel 12_a_. When movably supported, the circumferential wall 73 can be for example pivoted between a closed position where it follows the curvature of the corresponding frame 75, as shown in FIG. 13; and an opened position where it remains supported by the frame 75 but displaced from axial alignment with the frame 75.

To provide a segment 70 with an opening (either as an inlet or on outlet) one or more of the sections may be simply removed or omitted. The circumferential extent of the openings, be they inlets or outlets, may be fixed or variable. The ability to vary the circumferential extent of an opening can be achieved for example by the use of movable doors (for example sliding the pivoting) as explained in greater detail later in this specification. In one example for a system 10 and barrel 12 with fixed or static openings, the circumferential extent may range, but is not limited to, from about 45° to about 180°.

The segments 70_c_. 70_d_, 70_g_ and 70_h_ (see FIG. 16) have respective circumferential walls which have no openings and so their corresponding inner impervious impact surfaces 14_s_ extend for a full 360°. For those segments 70 having openings, the corresponding impervious impact surface 14_s_ extends for 360° minus the circumferential extent of the opening.

The texturing of the individual impervious impact surface 14_s_, and thus the overall composite impact surface 14 of the barrel 12_a_ may be in any of the forms described above in relation to the first embodiment of the barrel 12.

Although not shown in the drawings, in this embodiment louvres, the same or similar to those described above in relation to the first embodiment, may be located in or across the outlets 22 and operable for varying an effect open area of the outlets.

The present embodiment lends itself to the incorporation of an aperture mechanism 74 (see FIGS. 14, 16 and 18) located between two mutually adjacent segments 70. Conveniently the aperture mechanism 74 may be coupled between the frame 75 of mutually adjacent segments 70. The aperture mechanism 74 enables control of a flow of material between the mutually adjacent segments. The aperture mechanism 74 provides another way to control the residence time of the material within the mill by varying the flow area between adjacent segments. In the absence of the aperture mechanism 74 the flow area between adjacent segments is in effect $\pi r^2$ where "r" is the inside radius of the segments 70. This flow area can be decreased by use of the aperture mechanism 74.

Figure 18:
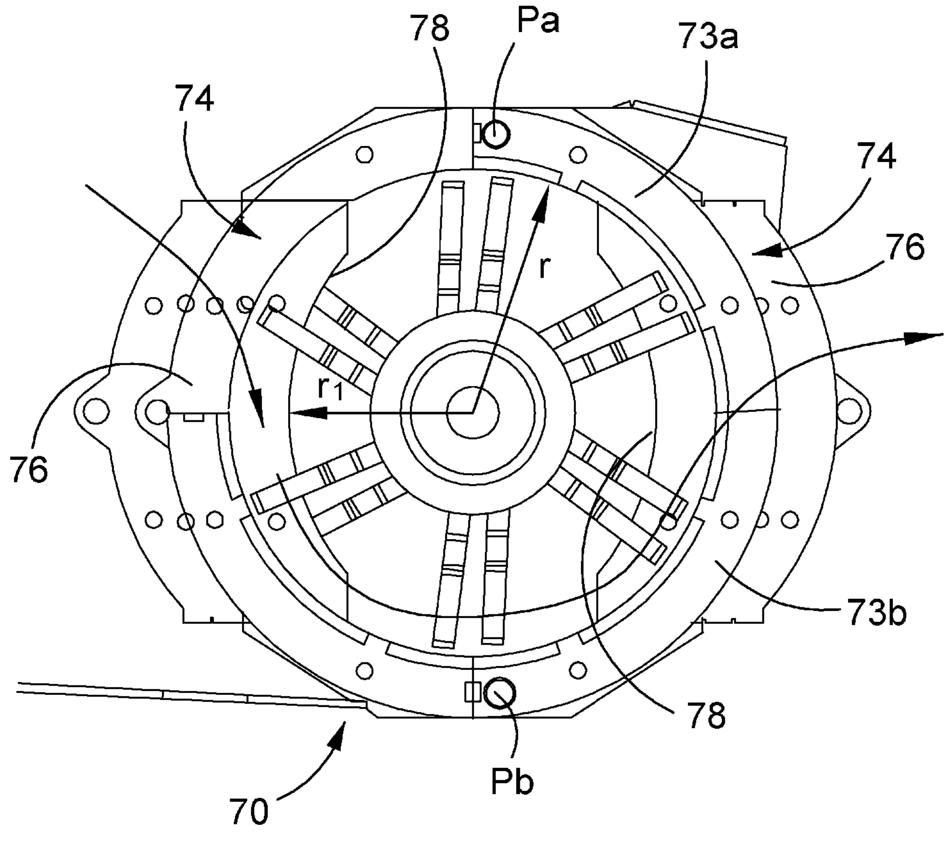
FIG. 18 is an end view of an embodiment of the barrel shown in FIGS. 14-16.

In the illustrated embodiments the aperture mechanism 74 is in the form of a set of one or more plates 76 having inner edges 78 that can be moved radially inwardly and outwardly to vary the effective flow area between adjacent segments 70. FIG. 18 shows a segment 70 with a radius "r" and an aperture mechanism 74 comprising two opposed plates 76 coupled with the segment 70. The plates 76 have been moved in a radial inward direction so that their inner edges 78 lie on a radius $r1<r$, thereby reducing the flow area from a maximum of $\pi r^2$, when the aperture mechanism 74 is retracted so that the edges 78 lie on the radius r, to a smaller flow area.

The position of the aperture mechanism 74 can be varied by removing mechanical couplings between adjacent segments 70, moving the aperture mechanism 74 to produce the desired flow area, and then reinstalling the mechanical couplings.

In a different embodiment aperture mechanism 74 may be provided as one of a set of a plurality of interchangeable aperture mechanisms wherein at least two aperture mechanisms have a central opening of different area. For example, the aperture mechanism 74 in a set may each comprise an annular plate with a different inner diameter. In an alternate arrangement the aperture mechanism 74 may comprise a plurality of plates that slide or rotate relative to each other, for example similar to an aperture of a camera. In this way once the aperture mechanism 74 has been installed in the barrel 12*a* the size flow area can be changed by operation of an actuator and associated mechanisms such as a lever, cam or gears. When installed on a combine harvester for the purposes of milling chaff, this variation of flow area may be adjusted by a driver operating an in-cab control. Irrespective of its physical form the aperture mechanism 74 enables control of the residence time and thus the degree of processing of the material.

Additionally, or alternately to the aperture mechanism 74, this and other embodiments of the disclosed system 10 and barrel 12 can be provided with internal vanes or fins that extend radially inward from the impact surface 14. The vanes are used to increasing or decreasing the pitch length of the spiral flow path, in a manner similar to that described above in relation to the ribs 24. To be able to do this the vanes or ribs are coupled with the barrel 12 in a manner so that their angle relative to the axis 16 can be varied. For example, linear actuators located on the outside the barrel 12 can be connected to the barrel to the vanes or fins. The actuators can be controlled by a combine operator from the combine cab.

If desired mesh screens can be provided across the openings, be they inlets 20 or outlets 22. Although it is envisaged that most likely if screens are provided that are installed across the outlets 22. For the outlets 22, the screen could be used in conjunction with or as an alternative to the louvers 50.

The impact mechanism 18 for the barrel 12*a* (and 12*t*) shown in FIGS. 14-18 (and FIG. 13) may be of the same form as that described in relation to the first embodiment shown in FIGS. 1-9.

In each of the disclosed embodiments the inlets 20 and the outlets 22 are rotationally offset from each other about the rotation axis 16. Therefore, a piece of material entering through an inlet 20 (or its corresponding fragments following impact with the impact mechanism 18 and/or against the impact surface 14) must travel in a path about the rotation axis to reach an outlet 22. Moreover, when the inlets 20 and outlets 22 are offset from each other along the rotation axis 16, the material (or its fragments) must travel in a spiral like path to move from an inlet to an outlet. This path may comprise more than one complete revolution about the axis 16. Although it should be understood that due to the configuration of the system 10 the material being processed is directed to flow in a spiral path irrespective of whether or not the inlet 20 and the outlet 22 are rotationally offset.

The number of revolutions may be controlled by any one, or any combination of 2 or more of:

- the form or configuration of the texturing on the impact surface 14, as described above in relation to the first embodiment;
- by the operation of the apertures 74 increasing the residence time of the material within the barrel 12*a;*
- the axial distance between inlets and outlets along with the axis 16 of the barrel 12*a;*
- the angle of inclination θ of the ribs 24; and
- the angle of inclination/pitch of vanes or fins that extend radially inward from the impact surface 14.

The above described ways of controlling the number of revolutions is applicable to all embodiments of the disclosed system 10 and barrel 12.

A mill incorporating the barrel 12*a* shown in FIGS. 14-18 may include an impact mechanism 18 rotatably supported within the barrel 12*a*, housing 32 and distributor 44 as described above and shown in FIGS. 1-9.

Also, in the illustrated embodiments the hammers 54 are depicted with generally planar surfaces 62 and 64 that extend in a radial direction to their axial edge 58. However, the impact side 62 may be curved. Moreover, the impact side 62 can be curved in different directions depending on the axial location of the hammers, and in particular their axial distance relative to the inlets 20 and the outlet 22. For example, the impact side 62 can be curved or hooked in a forward direction with reference to the direction of rotation about the axis 16 near the inlets 20 to assist in scooping material and air into the barrel 12. However, near the outlet 22 and the mid plane 28 the impact side 62 may be: planar as in the illustrated embodiment; or, curved or hooked in a rearward direction with reference to the direction of rotation about the axis 16 to increase radial exit velocity. Indeed, in a more general sense, the system may incorporate different hammers 54 along the axis therebetween. These differences may be in terms of one or more the length, shape, and configuration of the hammers. Also, in this and every other embodiment of the disclosed system 10 and barrel 12 the distance between the edge 58 of the hammers 54 and the impact surface can be varied. This variation may be controllable by way of a control system that can be operated by a driver from a cabin of a combine fitted with the disclosed system 10.

The shape, configuration and/or orientation of the hammers also influences air flow and may be designed to generate a specific effect on air flow, and thus material flow, through the system 10. The shaping may include curving of the hammers 58 as described in the above paragraph. Alternately the hammers may be orientated so that they remain planar but lie in planes that are oblique relative to the radius of the mill. The hammers 58 may be oriented in the oblique planes symmetrically about opposite sides of the central radial plane 28. In yet a further variation the hammers may be twisted or angled for example like a fan blade or provided with an aerodynamic profile like a propeller to generate an airflow in a specific direction for example from an inlet 20 to an outlet 22.

In a further variation the distributor 44 may be coupled to or otherwise operatively associated with a pivoting or self-levelling cleaning shoe of a combine to provide an even distribution of feed to the inlet chute 34 and thus the inlets 20 when a combine is traversing an incline or unlevel ground. This is shown for example in FIGS. 28*a*-28*e* where a distributor 44 is coupled to a cleaning shoe 29 of a barrel 12*v* (described in greater detail later). In some embodiments the distributor 44 can reciprocate backward and forward in a horizontal plane. In addition, because of the coupling of the distributor 44 to the cleaning shoe, the vibration of the cleaning shoe is also imparted to the distributor 44.

In the illustrated embodiments of the barrel 12, 12*t*, and 12*a* the distribution of openings forming inlets and outlets are arranged symmetrically about the mid plane 28. But as explained later this is not an essential requirement and may vary depending on the combine to which the mill is mounted and relative locations of the sieve of the combine and the inlet of the mechanism to which the output the of the system 10 is fed. Also, while in the illustrated embodiments openings acting as inlets are provided at the axial ends of the barrel 12, 12a, with outlets provided between the axial ends; this can be reversed so that milled material exits from one axial end or both opposite axial ends.

As may be appreciated by those skilled in the art the basic function of embodiments of the disclosed barrel allow material to pass through without tight control on size. The amount of seed damage/devitalisation is controlled by the angle of wrap about the axis 16 and number of rotations about the axis 16, speed of rotation of the impact mechanism and the configuration of the impact surface 14. As previously discussed the surface has the ability to separate and damage seeds while providing no or less damage to straw; or otherwise provided a differential flow, and/or processing, of weed seeds and straw.

Figure 19:
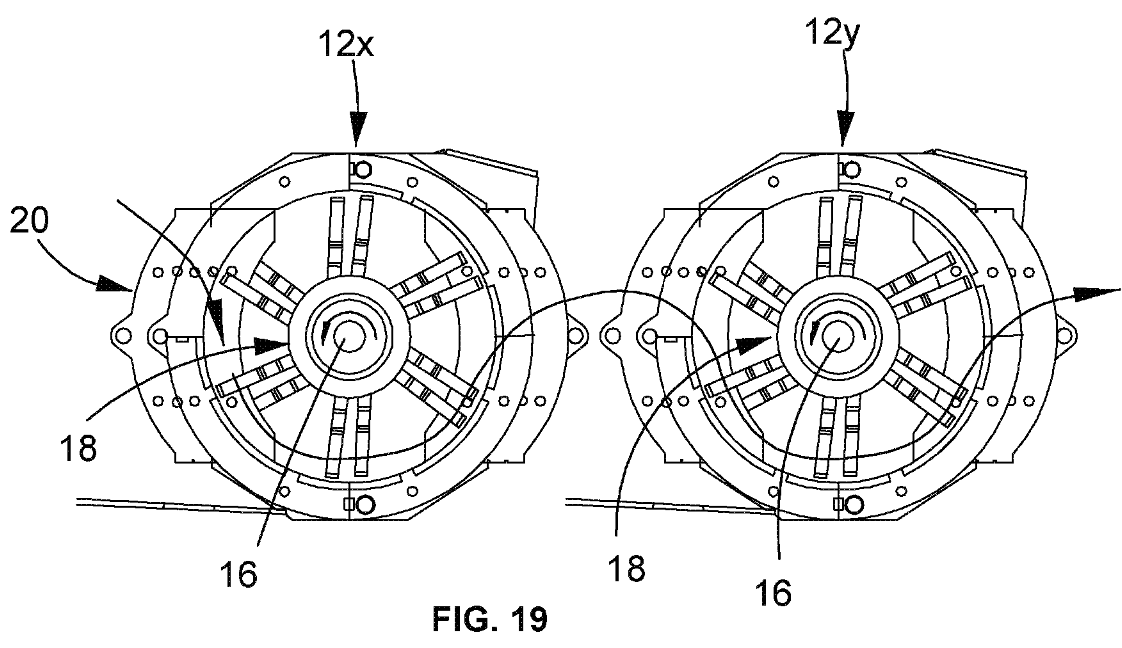
FIG. 19 is a schematic representation of a possible arrangement of barrels in a fourth embodiment of the disclosed system.

In yet a further variation shown in FIG. 19 a plurality of barrels 12x, 12y may be provided side-by-side, with their respective axes 16 parallel to each other and arranged so that the discharge from one barrel 12x feeds directly into the inlet of the adjacent barrel 12y. In this embodiment each of the barrels 12x, 12y has an inlet 20 and an outlet 22 that extends for the substantially the full length of that barrel 12x,y; but are circumferentially spaced by 180° from each other. Thus, material entering the inlet 20 of the barrel 12x will travel through about 180° to the outlet 22, where it would then flow into the inlet 20 of the adjacent barrel 12y and travels through a further 180° before reaching the outlet 22 of that barrel. Thus, in effect the material would have passed through a full revolution about the axis 16 of any one barrel, being milled between the impact mechanism and the impervious impact surface 14. A potential benefit of a mill incorporating 2 (or more) barrels 12 side-by-side in the manner shown in FIG. 19 is increased throughput.

Figure 20:
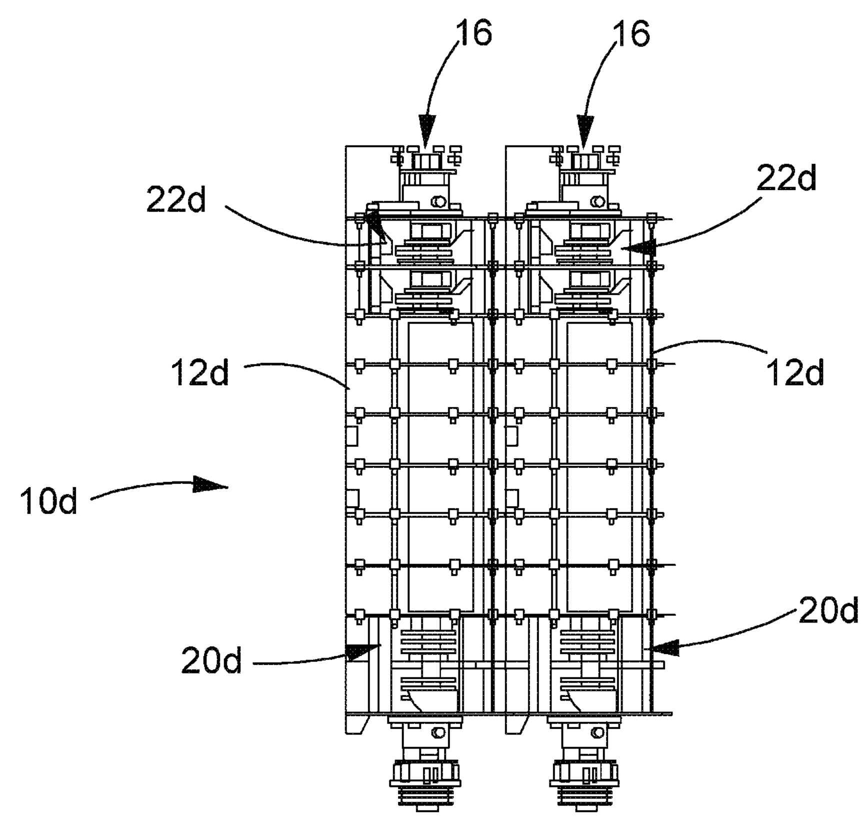
FIG. 20 is a schematic representation of a possible material processing arrangement constructed from two systems each in accordance with a fifth embodiment of the disclosed system.

FIG. 20 depicts a barrel system 10d having two barrels 12d arranged side by side. Each barrel 12d receives approximately one half each of the total chaff stream and feed the milled chaff to a pair of side-by-side chaff spreaders (not shown). The system 10d has an inlet 20 one axial end and an outlet 22 at an opposite axial end. Moreover, the system inlet 20 comprises separate inlets 20d one in each of the barrels 12d. Likewise the system outlets 22 comprises separate outlets 22d one in each of the barrels 12d. Thus, in contrast to the earlier illustrated embodiments the barrel system 10d to not have inlets 20 at opposite axial ends. Because of this each system 10d does not need and is not provided with a distributor 44. Nevertheless, a distributor 44 or an equivalent structure for feeding substantially equal amounts of the chaff stream to each of the inlets 20 may be provided.

The barrels 12d are mounted side-by-side with their respective axes 16 parallel to each other and their respective inlets 20 and respective outlets 22 being radially adjacent to each other. This provides parallel processing of the chaff stream. In a conceptual sense the system 10d may be considered to be the functional equivalent of the system 10 shown in FIGS. 15 and 16 cut in half in the mid plane 28 between the two outlets 22 and folded back on itself so that the two halves lie parallel to each other with their inlets 22 mutually adjacent and their inlets 20 mutually adjacent. In this embodiment of the mills 10d may be mounted in a north-south orientation rather than the east west orientation shown in FIGS. 1, 2, 9 and 13-19.

In a variation to the embodiment shown in FIG. 20 the inlets 20d can be formed at the axial end of the respective barrels 12v, rather than in the circumferential surface of the barrels 12v. Doing this may simplify the feed arrangement and input flow of material into the barrels 12v because for example chaff can be fed directly in to the barrels 12v in the axial direction so that the chaff feed from the sieve does not need to change direction to enter the barrels 12v. This may however necessitate a moving of the bearings for the respective shafts in the barrels 12v.

Alternately the inlets 20d may be kept in the circumferential wall of the barrels 12v, and the outlets 22d moved from the circumferential wall to the adjacent axial end. Indeed, as suggested earlier in this specification, both the inlets 20d and the outlets 22d can be located at the axial opposite ends of the respective barrels 12v. In each one of the above variations for the inlet and outlet location, the material being processed travels in a spiral path between axially spaced apart inlets and outlets. When an axial end is not used as an inlet or an outlet, is closed by a plate or other structure for example as shown in FIGS. 2, 7, 9, 16, 20, 22a, 22b, and 27-28b.

FIGS. 24a-28d depict yet another alternate configuration and construction of the barrel, designated as 12v and associated system 10v. The barrel 12v has a central section 120 and opposite end sections 122. The sections 120 and 122 are coupled together and co-centric with the central axis 16. In this embodiment each of the sections 122 is provided with inlet openings 20 enabling material to be fed into the barrel 12v. The sections 122 are tapered, increasing in their outer diameter in the axial direction toward the centre or mid transverse plane 28 of the barrel 12v. The tapered sections 122 are configured so, at their axial inner most end 124, their interior surface has the same inner diameter as that of the central section 120.

Optionally the tapered section has a cut off plate 139 which may be angled to the direction of the flow. Plate 139 slows the circumferential velocity and adds an axial velocity component to stop material traveling around and around and move the material toward the centre of the machine.

In yet a further variation (not illustrated) applicable to this and all other embodiments of the disclosed barrel, rather than only a length of the barrel commensurate with the inlets being tapered, the taper may extend to the central plane 28 of the barrel, or indeed for the full length of the barrel. The latter may be applicable for example in embodiments where the barrel has an inlet at one end and an outlet at an opposite end for example similar to that shown in FIG. 20. The inclusion of such a taper can assist in the flow of material and air because it creates a reduction in pressure from a small diameter end to a large diameter end of the taper.

Figures 24A, 24B, 24C, 24D, 25:
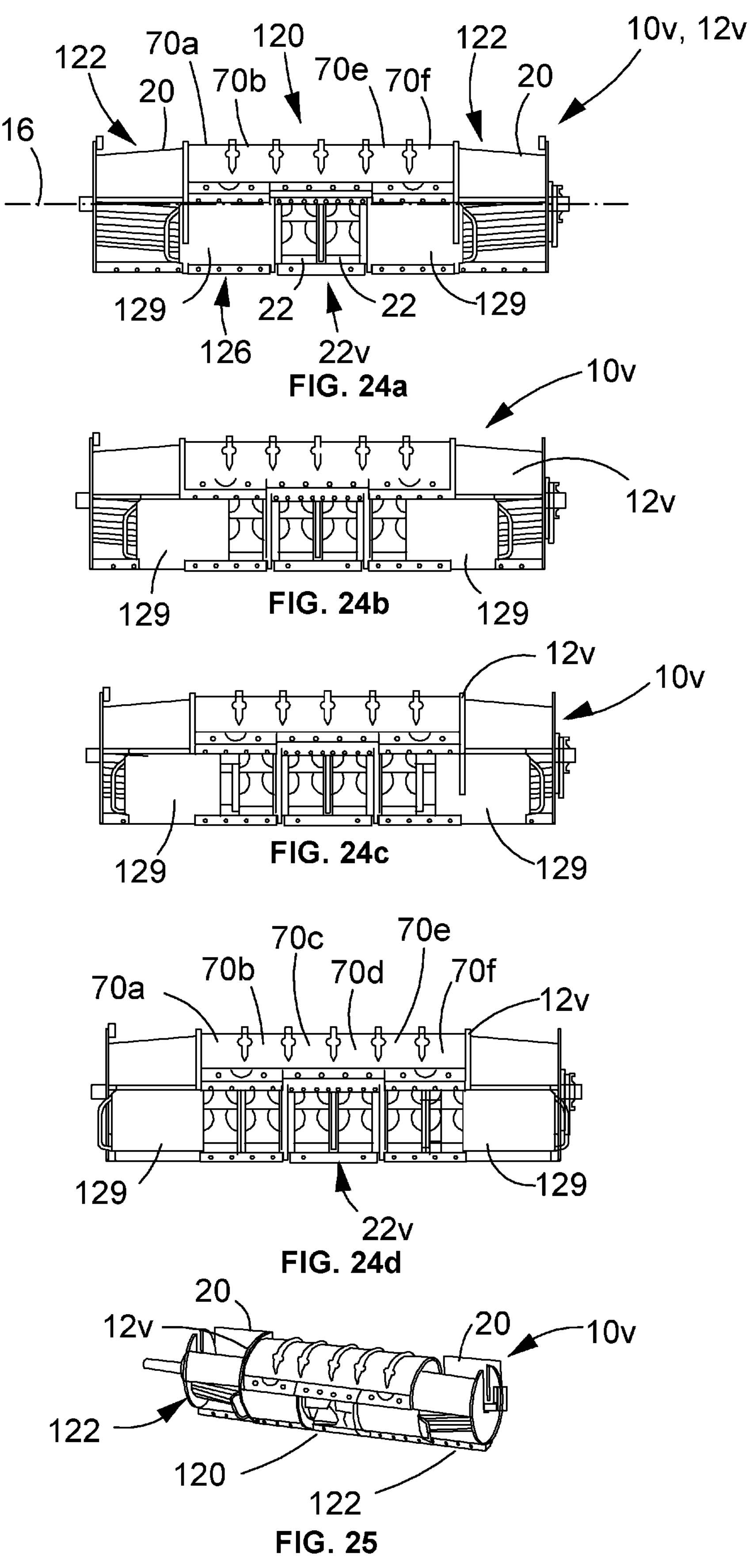
FIGS. 24*a*-24*d* depict a sixth embodiment of the disclosed barrel which comprises a central portion and opposite end portions that are coupled together as well as an outlet control system which is operable to vary the total area of the outlet of the barrel. The outlet control system shown in different positions, progressively opening from a minimum outlet area position shown in FIG. 24*a* to a maximum outlet area position shown in FIG. 24*e;*
FIG. 25 is a perspective view of the embodiment of the barrel shown in FIGS. 24*a*-24*d;*

As most clearly seen in FIG. 24d the central section 120 has an outlet 22 that extends for, in substance its whole length. The central section 120 is constructed from a plurality of individual segments 70a-70f (hereinafter referred to in general as "segments 70") which are coupled together side-by-side along the central axis 16. The outlet 22v is comprised of individual outlets 22 in each of the segments 70.

The barrel 12v includes an outlet control system 126 which is operable to vary the distance between an inlet 20 and the outlet 22v and so the path length and residence time of material flowing through the barrel 12v. The outlet control system 126 varies the axial distance between the inlets 20 and outlet 22v. In this embodiment the outlet control system 126 comprises two gates 129 that are slidably supported on the barrel 12v and can be moved in an axial direction toward and away from each other. (Although in other embodiments the same effect can be achieved by providing a plurality of gates that together can cover the entirety of the outlet 22 and can be individually moved by: way of a pivoting or swinging action; or, sliding in a circumferential direction, i.e. about the axis 16 direction.) Each gate 129 has a circumferential width at least equal to the circumferential width of the outlet 22*v* (and therefore also each of individual outlets 22). Actuators (not shown) may be controlled from a cabin of a combine to which the barrel 12*v* and system 10*v* is fitted to control the position of the gates 129 and therefore the distance from an inlet 20 to the outlet 22*v*.

In this embodiment the outlet control system 126 enables the distance between an inlet 20 to the outlet 22*v* to be varied between a minimum in which the gates 129 are at their respective axial outer most positions and uncover the entirety of the outlet 22*v*, shown in FIG. 24*d*; to a maximum where each gate 129 is moved in the axial inward direction (i.e. toward each other) and each covers about one third of the outlet 22*v*, shown in FIG. 24*a*. When the control system 126 is in the configurations shown in FIG. 24*d*, providing the minimum distance between an inlet 20 and the outlet 22*v*, the system 10*v* and barrel 12*v* provide minimal material processing and in effect act as a chaff spreader. This may also be considered as being a "bypass" configuration of the system 10*v* and barrel 12*v*.

By operating the outlet control system 126 to vary the distance between an inlet 20 and the outlet 22*v* the path length and thus number of rotations of material about the axis 16 can be varied from the minimum shown in FIG. 24*d* to the maximum shown in FIG. 24*a*. Commensurate with this the percentage of seed devitalisation increases, as does power consumption. When the distance is at the minimum then the barrel 12*v* and corresponding system 10*v* in essence act as a blower generating an air flow than entrains the weed seeds. This additional air flow may be feed into downstream equipment such as a spinner or spreader, or straw chopper or a tailboard that spreads the material by directing the material as shown in FIGS. 29-36.

Figure 26A:
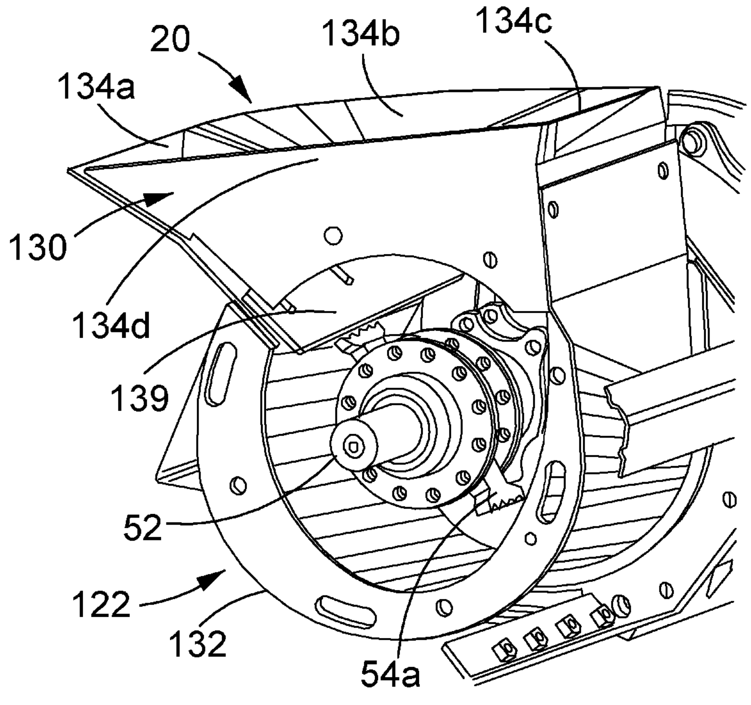
FIGS. 26*a*-26*c* are perspective, side and top views respectively of the end portion of the embodiment of the disclosed barrel shown in FIGS. 24*a*-25.
Figure 26B:
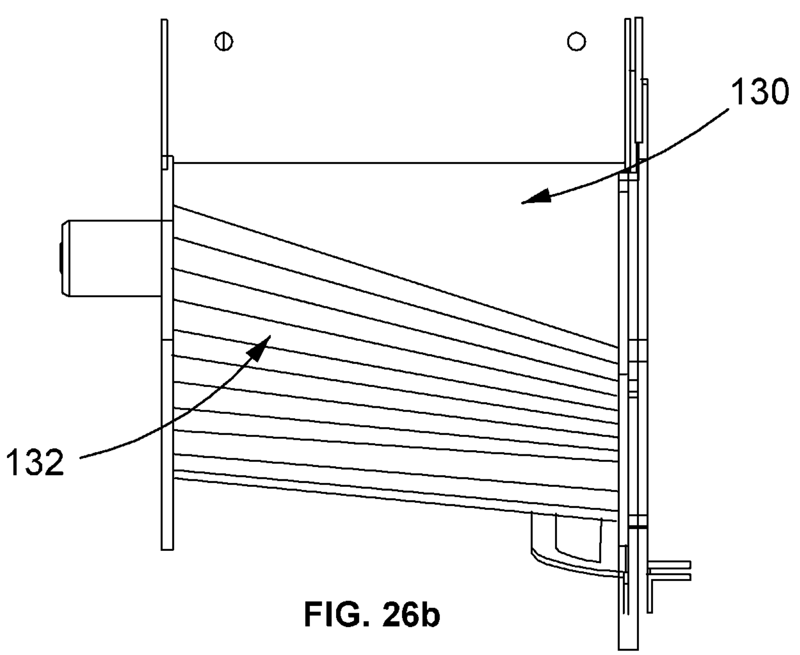
Figure 26C:
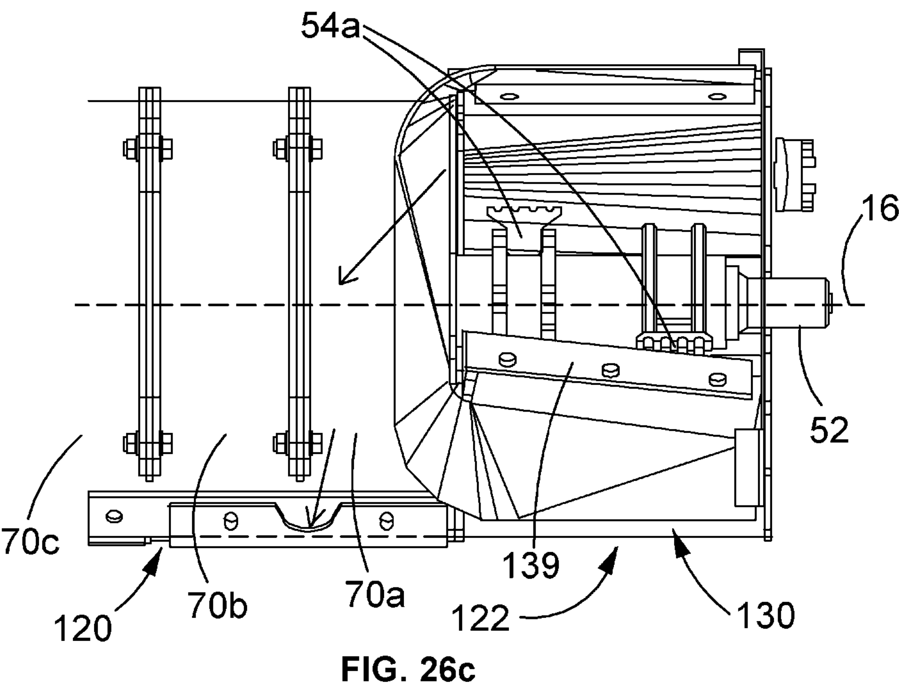

FIGS. 26*a*-26*c* show one of the end sections 122 of the barrel 12*v* in more detail. The inlet 20 of the section 122 comprises a hopper 130 and a partial frusto-conical portion 132. The partial frusto-conical portion 132 has an opening into which the hopper 130 is fitted. This opening extends for the axial length of the portion 132. The hopper 130 has at least a first sloping wall 134*a* that assists in directing feed material for the barrel 12*v* toward the central axis 16. In this embodiment the hopper 130 also has a second sloping wall 134*b* that also slopes to assists in directing feed material for the barrel 12*v* toward the central axis 16 and is perpendicular to the wall 134*a*. Indeed, the hopper 130 may be provided with additional sloping walls 134*c* and 134*d*, which together with the walls 134*a* and 134*b* define the mouth 136 of the hopper 130 forming an inwardly sloping surface around the entire inner circumference of the mouth 136. The inside of the inlet 20 there is a tapered cut off guide 139 that forces material in an axially inboard direction. The guide may be fixed to the wall 134*a*. Looking at FIGS. 26*a* and 26*c*, assuming the shaft 52 is rotating in the clockwise direction at least some of the material being induced to flow by air and mechanical act action of the hammers, when striking the guide 139 from below is forced axially inwardly which in FIG. 26*c* is to the left-hand side.

Optionally, hammers 54*a* or other feeding arms/mechanisms (hereinafter referred to in generally as "hammers 54*a*") may be attached to portion of the shaft 52 that extend through each section 122. The hammers 54*a* act primarily to assist in directing the feed material from the hopper 130 through the inside of the end sections 122 into the central portion 120. The assistance afforded by the hammers 54*a* is by a combination of physical impact and imparting of momentum to the weed seeds, and also generating an air flow in the axial in a direction, i.e. toward the middle of the shaft 52, or central portion 120. Due to the tapered nature of the end portions 122 the hammers 54*a* extend for a shorter length in the radial direction to the hammers 54 in the central portion 120.

Figure 27:
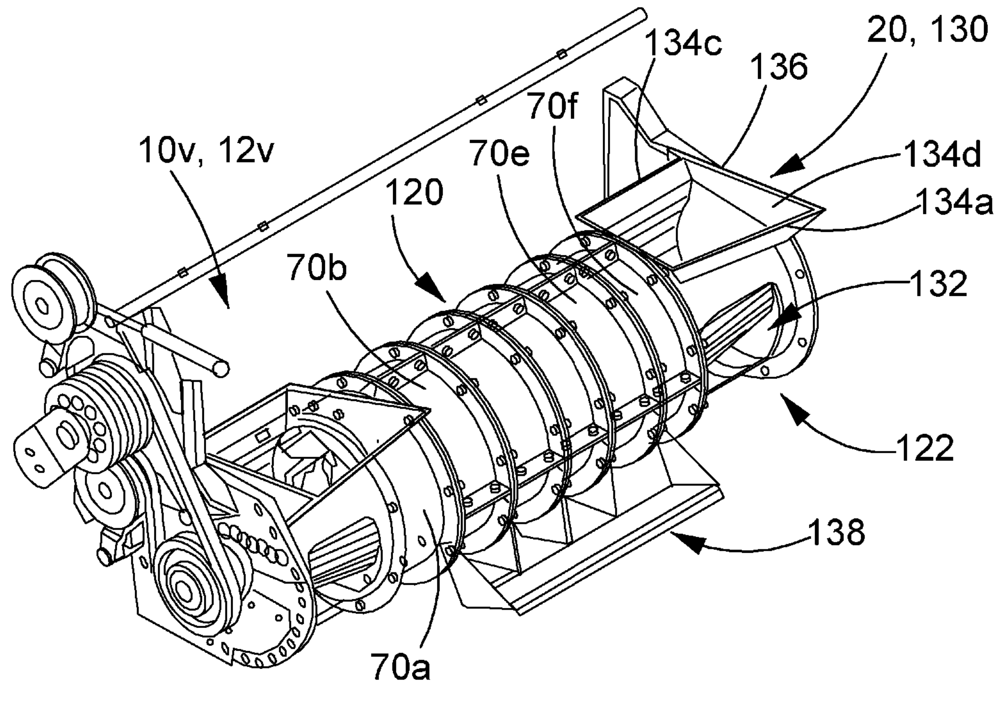
FIG. 27 is a perspective view of the embodiment of the disclosed barrel shown in FIGS. 24*a*-26*c* from an alternate angle and depicting the addition of an outlet deflector and a portion of a drive system for the impact mechanism within the barrel.

With reference to FIG. 27 an outlet deflector 138 may be coupled to an outside of the barrel 12*v* and arranged to direct the discharged processed material from the barrel 12*v* in a particular direction. In the embodiment shown in this Figure the deflector 138 extends for a length of two thirds of the length of the outlet 22*v*. More particularly the deflector 38 extends for a portion of the outlet 22*v* formed between the segments are 70*b* and 70*e* inclusive. An actuator (not shown) may also be provided that can be controlled from a cabin of a combine to vary the angle of the deflector 138. The outlet deflector 138 can of course be used with other embodiments of the barrel 12 described in the specification.

Each of the barrel is depicted in the embodiments described in relation to FIGS. 1-27 have either the whole of their length (FIGS. 1-23) or substantial portion of their length between opposite inlets (FIG. 24*a*-FIG. 27) with a constant inner diameter. However, in a further possible variation of these embodiments, these lengths may be conical in nature so that their inner diameter varies along the length of the axis 16. The purpose of this is to induce or enhance the flow of material and air through the barrel and in particular from the inlets to the outlets.

FIGS. 28*a*-28*e* depict how an embodiment of the system 10*v* and corresponding barrel 12*v* may be integrated into a combine. These Figures depict mechanisms and systems enabling the embodiment of the system 10*v* to work with and in a typical combine with minimal to no interference or detrimental effect to the operation of the combine. In these Figures for the purposes of visual simplification the barrel 12*v* is shown as a simple cylinder.

FIGS. 28*a*-28*d* show how the system 10*v* acts to integrate material flow throughout the combine. Material, for example chaff containing weed seeds, from a cleaning shoe 29 of a combine is fed to the distributor 44. The distributor 44 directs the chaff laterally to the inlets 20 at the axial opposite ends of the barrel 12*v*. The distributor 44 reciprocates backward and forward in a horizontal plane; and, is vibrated by its connection to the cleaning shoe 29. This motion acts to prevent or at least minimise the risk of the chaff sticking or building up on the surfaces of the distributor 44, which may otherwise cause blockage or an uneven distribution of material to the opposed inlets 20.

Figures 28A, 28B:
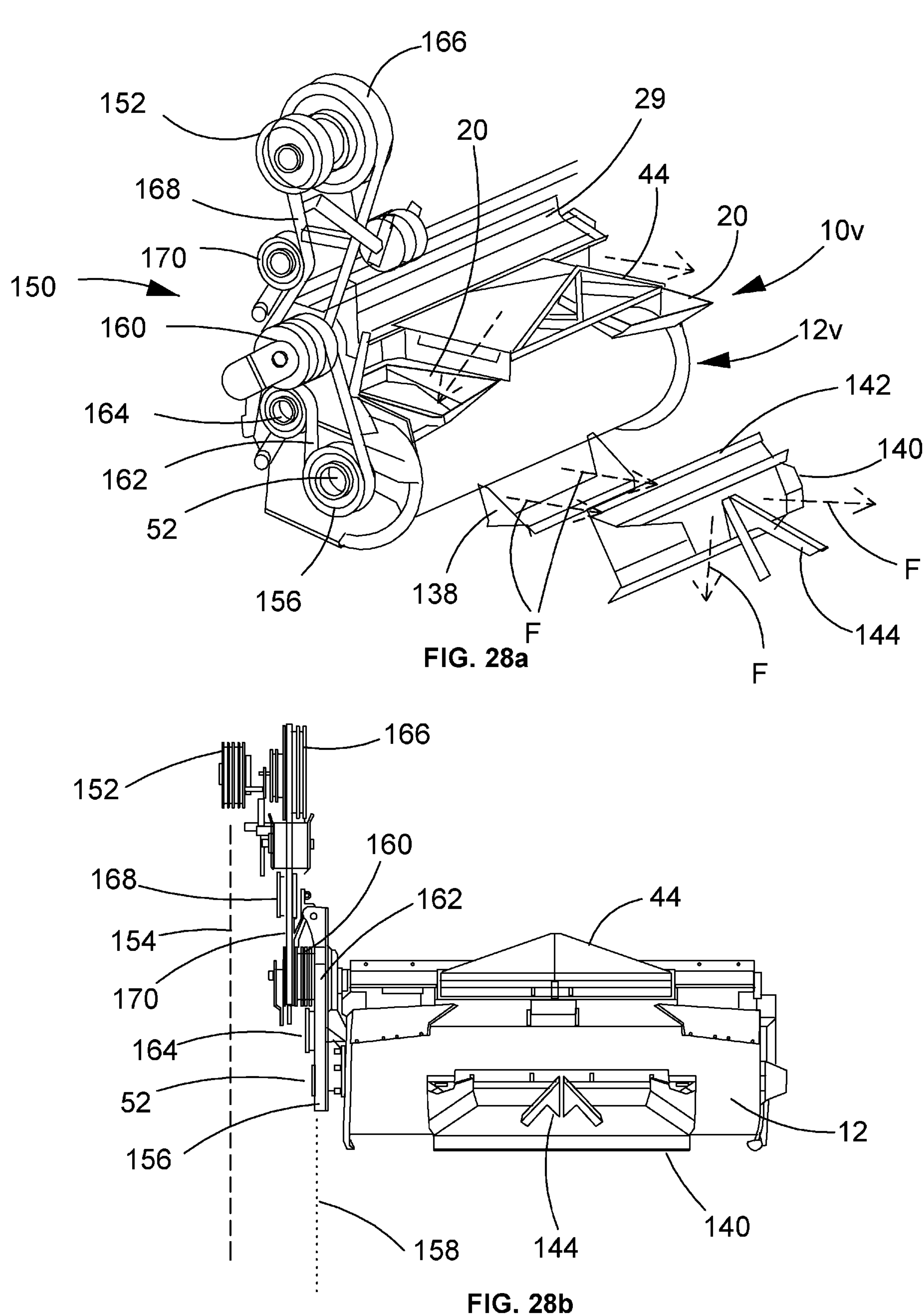
FIG. 28*a* is a schematic representation from one angle of an embodiment of the disclosed barrel shown in FIGS. 24*a*-27 integrated into a combine to form a material processing system and including: a feed conduit which may be fitted to the combine to assist in directing the processed material and air flow from the barrel into combine spinners or other downstream processing equipment; and, a drive system for driving the disclosed material processing system.
FIG. 28*b* is a front view of the system shown in FIG. 28*a* with material flow directed out of the page toward an observer.
Figure 28C:
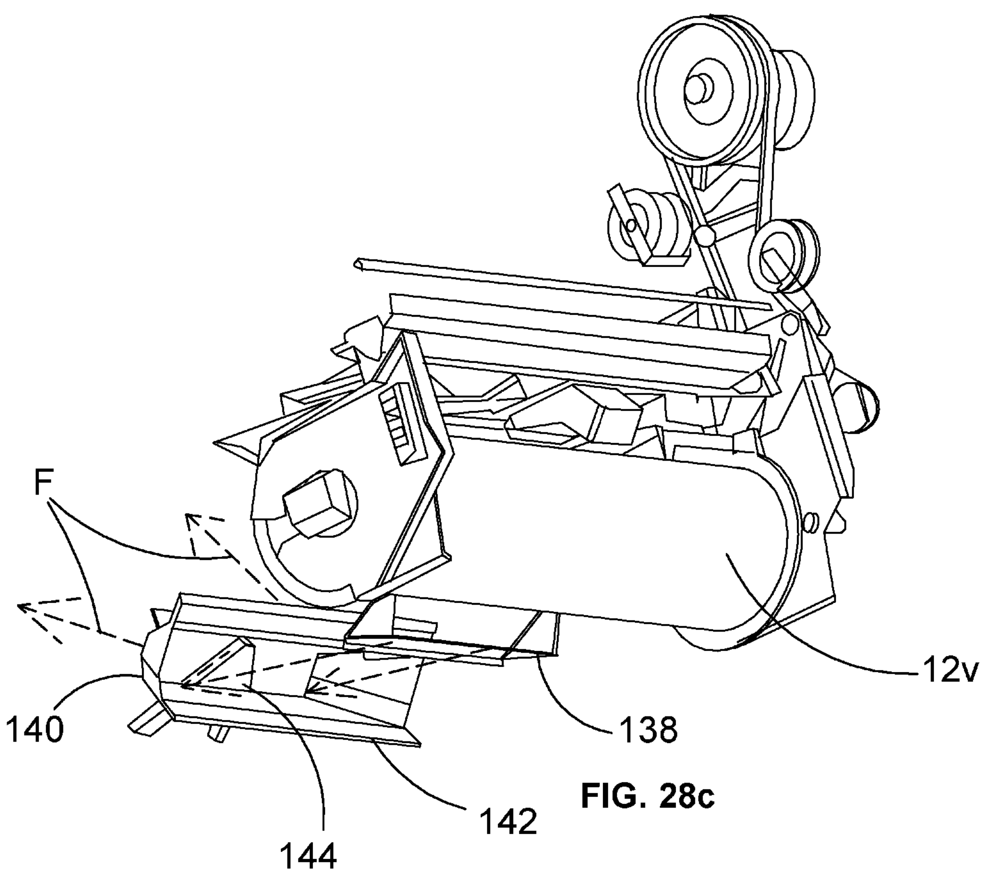
FIG. 28*c* is a perspective view from an alternate angle of the disclosed system shown in FIG. 28*a;*
Figure 28D:
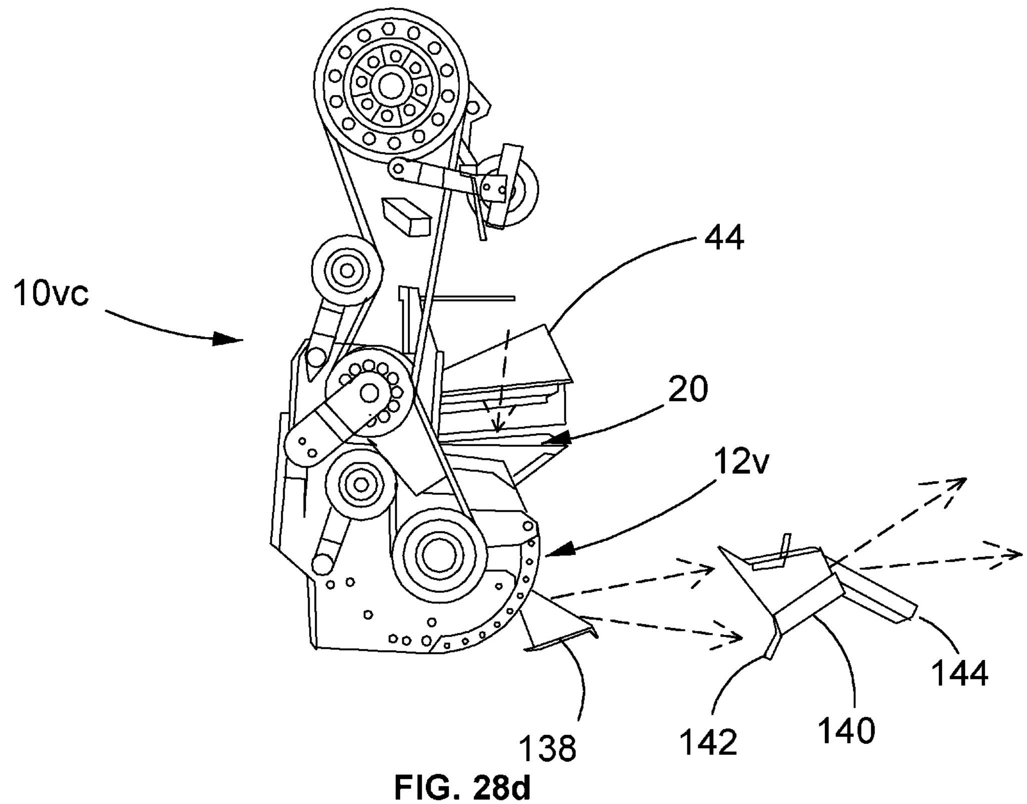
FIG. 28*d* is a side view of the disclosed system; shown in FIG. 28*a*
Figure 28E:
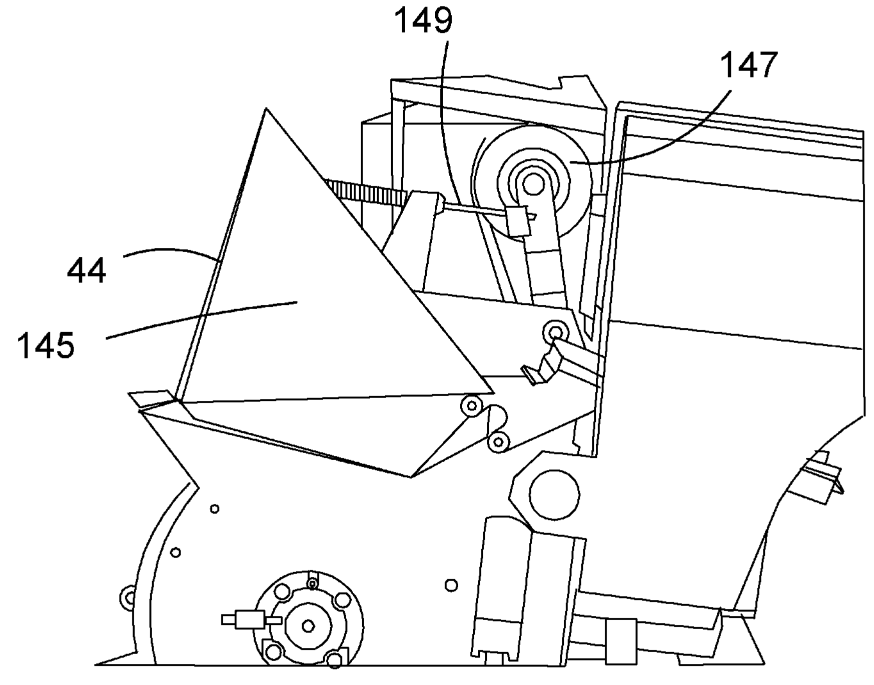
FIG. 28*e* shows a variation of the system of FIGS. 28*a*-28*d* in which a rubber or pliant cover is located over a feed distributor of the system.

FIG. 28*e* shows a further variation where the distributor 44 is static or otherwise fixed relative to the barrel 12 but is provided with a rubber or other pliant material cover 145 that lays over the surface of the distributor 44 and is caused to move or vibrate relative to the distributor 44. This can be achieved for example by coupling the cover 145 to: the top sieve; or a pulley 147 of the drive system 150 for the system 10 by an eccentrically coupled arm 149.

The material after being processed in the system 10*v* and barrel 12*v* is discharged through the outlets and onto the deflector 138. The deflector 138 deflects the discharge material into a feed duct 140. The feed duct 140 may be coupled to a structure, or other equipment of the combine. Nevertheless, the feed duct 140 is a part in the overall material flow integration provided by this and other embodiments of the disclosed barrel and associated system. In this embodiment the feed duct 140 is in the general form of a rectangular tube with a funnel like inlet 142. A discharge splitter 144 splits the material flow through the duct 140 into two separate and diverging streams. These streams may be fed to other processing equipment which are part of the combine such as a set of spinners which act to throw the receive material onto the ground across the width of a header of the combine. The general flow of the material/chaff is depicted in these Figures by the phantom arrows F. In this way the duct 140 acts as a link or conduit in the flow path of the processed material helping to constrain and guide the material and air flow to spinners or other downstream system/equipment with minimal diffusion or loss. The material streams may also provide additional material and air energy (velocity and pressure) to improve the spread of the system. Optionally the ducting can be fully sealed.

FIGS. 28*a*-28*d* also illustrate one possible drive system 150 for transferring drive from an engine/PTO of the combine to the shaft 52 of the system 10*v*. A belt (not shown) is used to transfer torque from the engine/PTO to an OEM pulley 152 (which is not a part of the drive system 150). As seen in FIG. 28*b*, without the drive system 150, the drive belt could engage to a pulley 156 coupled to the shaft 52 in a plane 154 (represented by the dashed line) if the shaft 52 were extended to the left hand side to reach the plane 154. But instead, the drive system 150 is configured to displace the plane inwardly toward a centre of the combine to a coupling plane 158 in alignment with the pulley 156 shown in FIG. 28*b*. The effect of this on a combine may be substantial in relation to its turning circle and overall maneuverability. This is because an embodiment of the system 10 is likely to be fitted in the same region or area of the combine as the steering axle and associated wheels. By configuring the drive system 150 to displace the coupling plane 158 in an inward direction toward a central the combine, interference with the turning circle and steering of the combine can be eliminated or at least minimised.

The drive system 150 includes an idler pulley/jack shaft 160 which is coupled to the pulley 156 by way of a belt 162. The pulley 160 rotates about an axis that is parallel to the shaft 52. A tensioner 164 may be interposed between the pulleys 156 and 160 to adjust tension in the belt 162. The pulley 160 is provided with multiple grooves (for example 6-8 grooves) and extends from one end coplanar the pulley 156 on the shaft 52 toward the plane 154. Moreover, the pulley 160 is formed with an axial length so that one of its grooves lies in the same plane as a transfer pulley 166. The transfer pulley 166 is coupled to the same shaft as the OEM pulley 152. A belt 168 is coupled between the pulleys 166 and 160. A tensioner pulley 170 may be disposed between the pulleys 166 and 160 to adjust the tension in the belt 168.

As shown in FIGS. 29-36 embodiments of the system 10 may be integrated with combines having various configurations of spinners or straw choppers, for feeding material: directly into a spinner or chopper and from above or below; or, directly onto the ground. This integration may incorporate the use of tail boards with fins in various positions, for example to give a divergent spread, or alternately a convergent centre spread. Depending on the configuration of the combine into which the system is integrated the relative positions of the one or both inlets 20 and outlets 22 may be shifted in the circumferential direction about the central axis 16.

Figure 29:
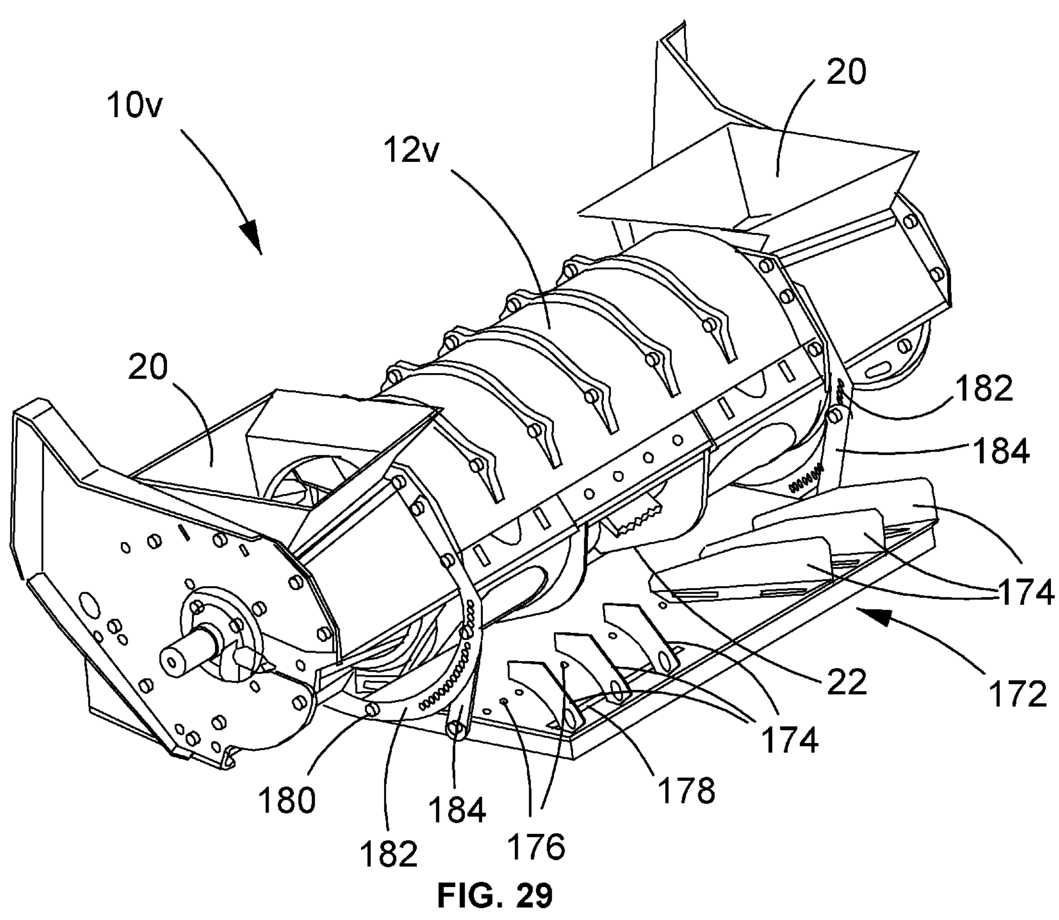
FIG. 29 is a schematic perspective view of an embodiment of the disclosed system incorporating a tailboard lying in a generally horizontal plane and having adjustable fins orientated to provide a divergent spread of material and air from the outlet of the associated barrel.
Figure 30:
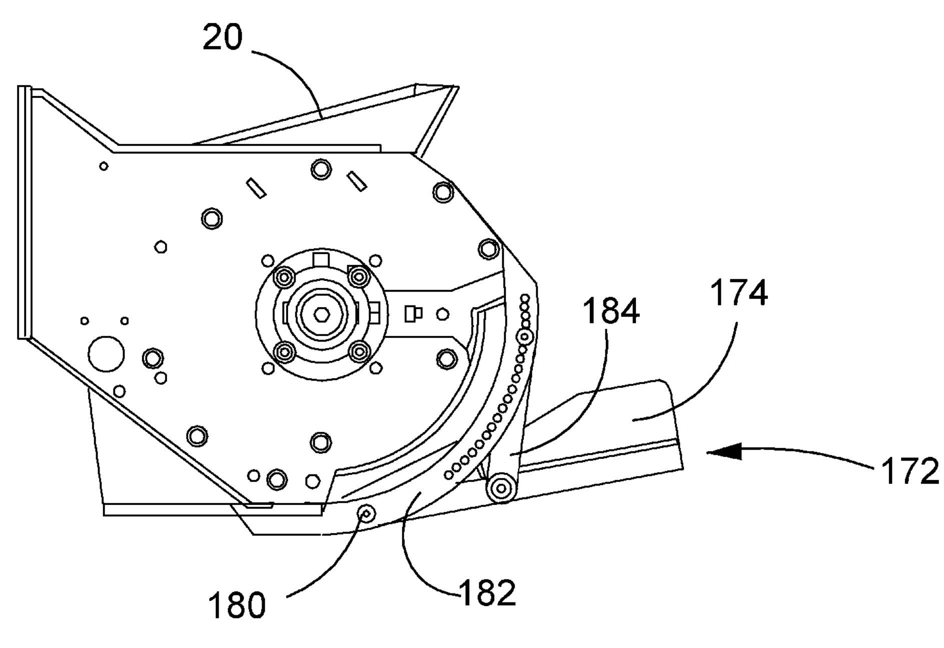
FIG. 30 is a side view of the embodiment shown in FIG. 29.

FIGS. 29 and 30 illustrate an embodiment of the system 10*v* which incorporates a tailboard 172 instead of the deflector 138 of FIGS. 28*a*-28*d*. The tailboard 172 is has a plurality of fins 174 that guide material flow and air flow existing the outlet 22. The position of the fins 174 can be adjusted by fixing one end of the fins in a respective one of a plurality of holes 176, and the opposite end at a position along a slot 178. In FIG. 29 the fins 174 are arranged to provide a divergent flow of material and air. Additionally, the tailboard is slightly inclined to project the material and air in an upward direction.

The tailboard 172 is pivotally coupled, by pivot pins 180 (only one visible) on opposite sides and at an end closest the barrel 12*v*, to respective curved brackets 182. Adjustment arms 184 are also pivotally coupled at one end to respective sides of the tailboard 172 and at another end in one of a plurality of holes formed on the curved brackets 182. This coupling arrangement of the tailboard 172 enables the inclination of the tailboard 172 to be adjusted. This can be done manually or, remotely by the use of actuators (not shown) that may be controlled from a cabin of the combine.

Figure 31:
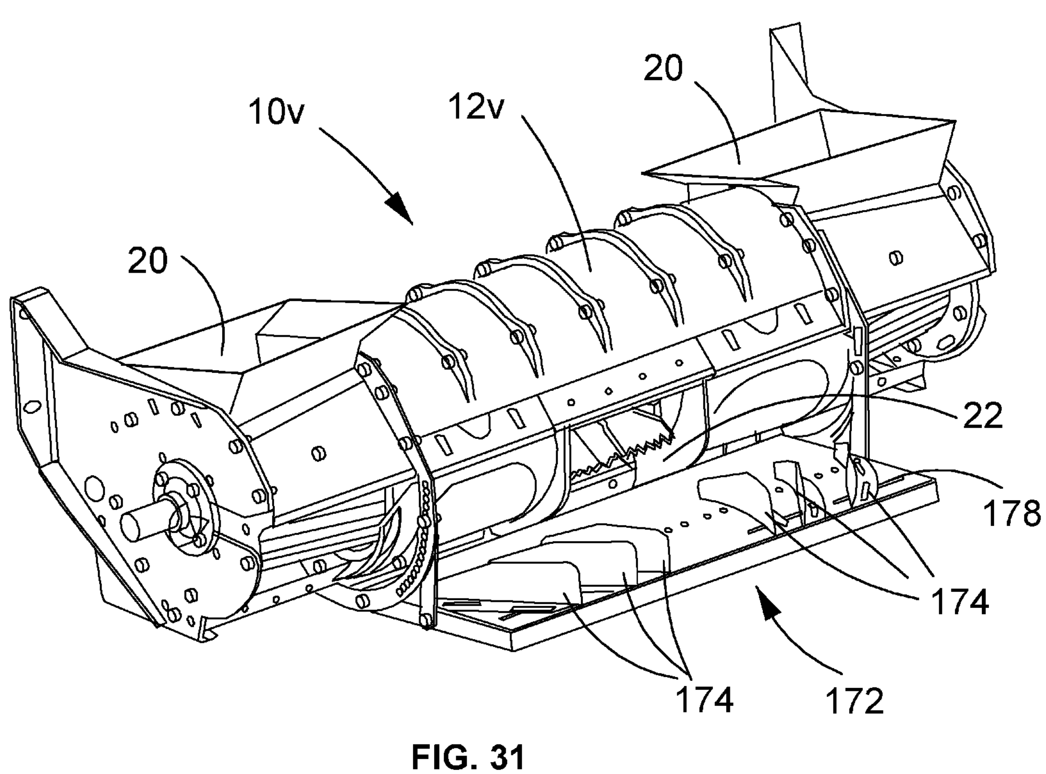
FIG. 31 is a schematic perspective view of an embodiment of the disclosed system as shown in FIG. 29 but with the fins of the tailboard reconfigured to provide a convergent flow of material and air from the outlet of the associated barrel.

FIG. 31 shows a variation of the arrangement of FIGS. 29 and 30 where the tailboard 172 is again generally horizontal but the disposition of the fins 174 has been changed so that they direct the material and air from the outlet 22 in a convergent rather than diverging manner. This configuration of fins 174 is useful when the material is being fed to downstream equipment such as a spinner or chopper.

Figure 32:
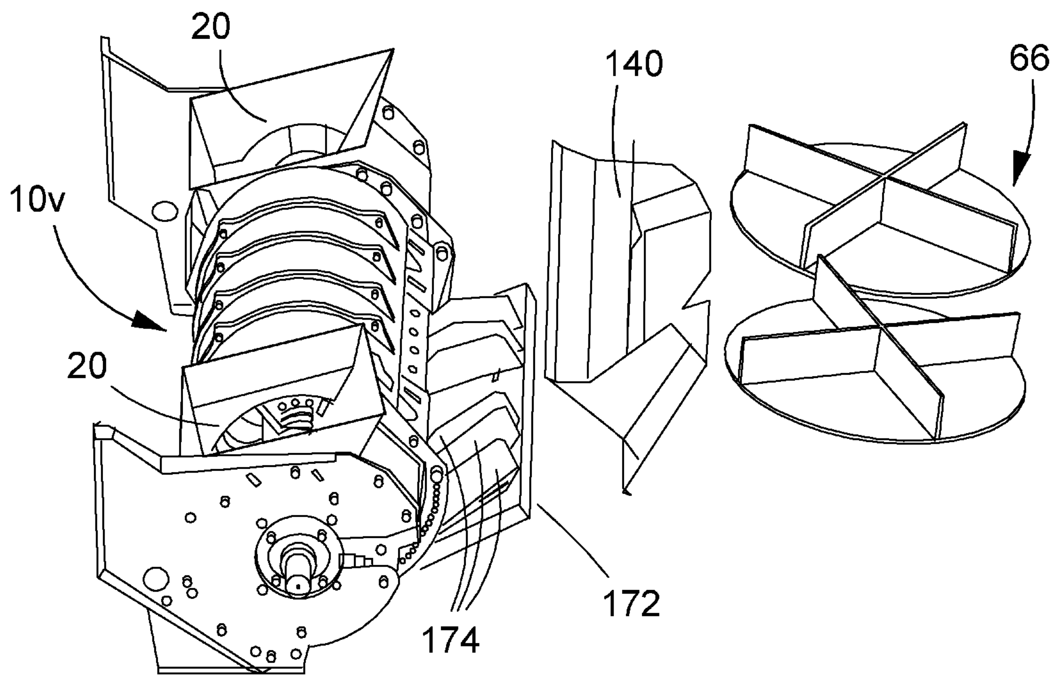
FIG. 32 is a perspective view of an embodiment of the disclosed system and showing how material flow is integrated into downstream equipment, in this instance spinners, of a combine. This Figure also shows the tailboard inclined upwardly from the horizontal plane to enable the system to feed material to downstream equipment from below.

FIG. 32 illustrates an embodiment of the system 10*v* with a tailboard 172 inclined upwardly from the horizontal to feed a set of spinners 66 from below. The fins 174 are arranged to provide a convergent flow of material and air through an optional intervening feed duct 140.

Figure 33:
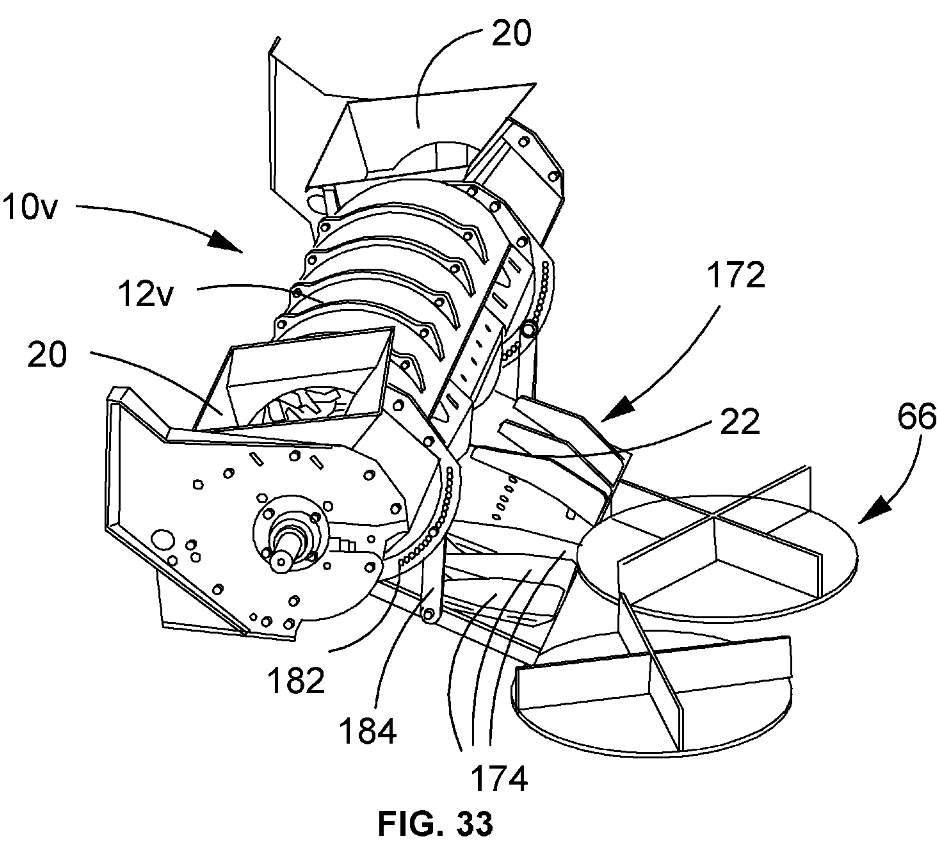
FIG. 33 is a perspective view of an embodiment of the disclosed system with an associated tailboard declined from horizontal plane to feed material and air from above to combine downstream equipment again this instance is in the form of spinners.
Figure 34:
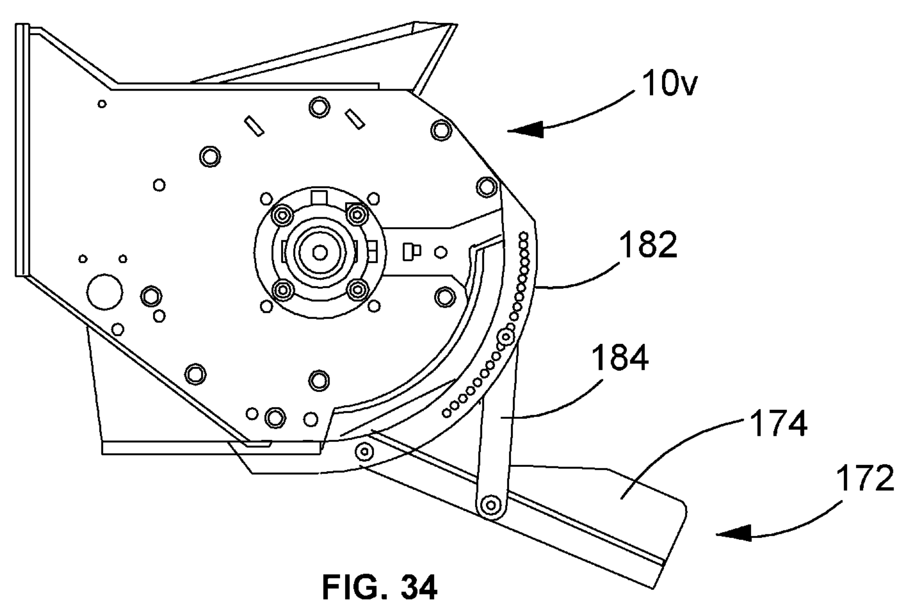
FIG. 34 is a side view of the disclosed system and associated sideboard shown in FIG. 33 but without the spinners.

FIG. 33 illustrates an embodiment the system 10*v* which is located above a set of spinners 66. Material from the outlet 22 converges due to the orientation of the fins 174 and is directed down the tailboard 172 into the spinner 66. So here the tailboard 172 is inclined below the horizontal to feed material and air into the spinners 66. In this embodiment there is no intervening feed duct 140 as in the previous embodiments. However, this duct 140 can be included if considered necessary or desirable for example to maintain pressurisation. FIG. 34 shows the system 10*v* of FIG. 33 (but without the spinners) from the side highlighting the declined angle of the tailboard 172 to facilitate the feeding of material from above to the spinners.

Figure 35:
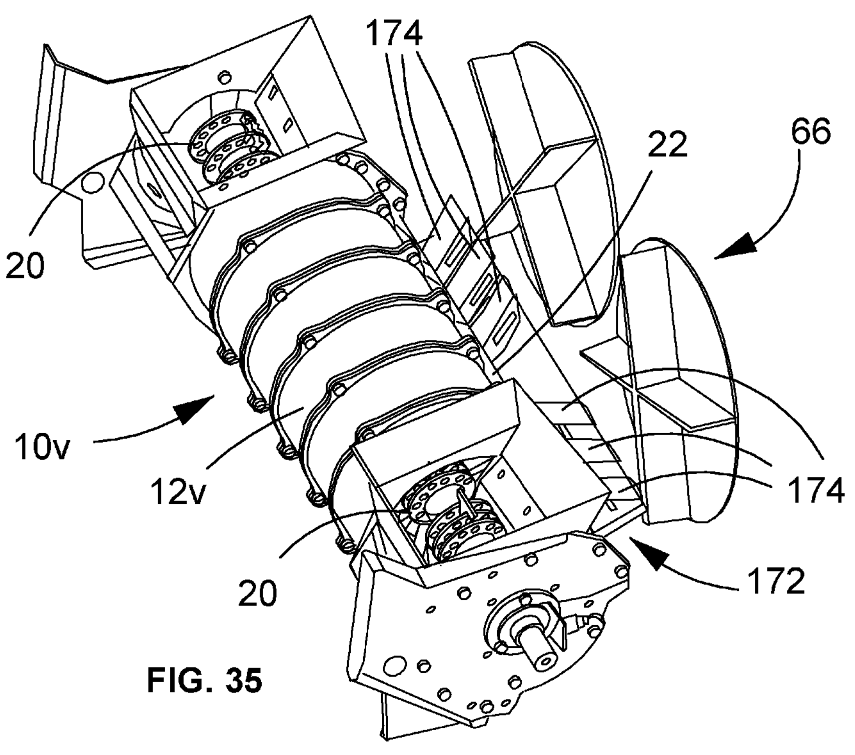
FIG. 35 is a schematic representation of the disclosed system integrated into a combine having vertically disposed downstream processing equipment (in this instance spinners) and where the associated tailboard with fins is arranged to provide a diverging flow of material to the vertical spinners.
Figure 36:
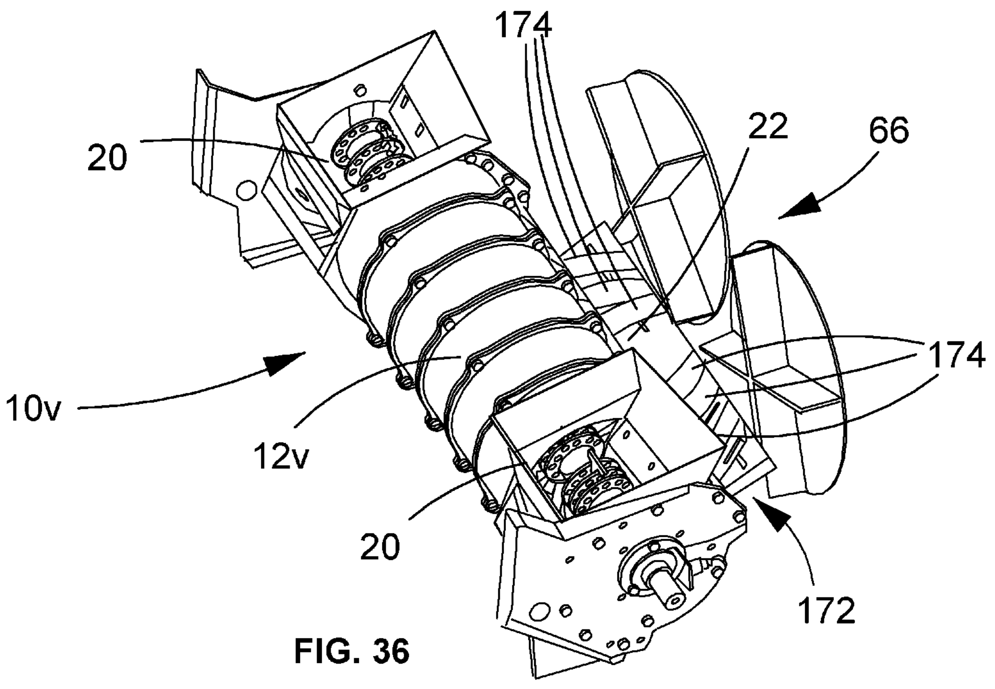
FIG. 36 is a schematic representation of the disclosed system as per FIG. 35 except that the tailboard fins are configured to provide a convergent flow of material to a region between the spinners.

FIGS. 35 and 36 illustrate the juxtaposition of embodiments of the disclosed system 10*v* in relation to vertically orientated spinners 66. The difference between the two embodiments is in the configuration of the fins 174 on their respective tailboards 172. In FIG. 35 the fins 174 are configured to produce a divergent flow of material to the spinners 66. Here the spinners rotate to throw material outwardly, i.e. towards opposite sides of an associated combine. In FIG. 36 the fins 174 are configured to produce a convergent flow of material to a region between the two spinners 66.

The arrangements shown in FIGS. 29-36 not exhaustive of the different ways in which embodiments of the disclosed system 10 and barrel 12 may be incorporated in a combine. The system and barrel may be installed and arranged to feed its processed material and generated air flow to other downstream equipment such as a chopper. Either by use of a tailboard angled in a particular manner and variations in the configuration of the fins; or, by otherwise orientating the barrel 12 and outlets 22, the outlet material can be directed to flow for example: (a) directly into a chopper by passing a spinner; (b) directly into the spinner; or (c) directly onto the ground; and the spinners 66 may be orientated in any plane form horizontal to vertical and from above or below the barrel 12. The flow of material from the outlet can be pressure fed using a sealed duct or conduit for example similar to the feed duct 140 described above. The duct 140 in some embodiments may be coupled directly to barrel 12 or a part of the system 10 and thus become part of the system 10 itself.

Figure 37:
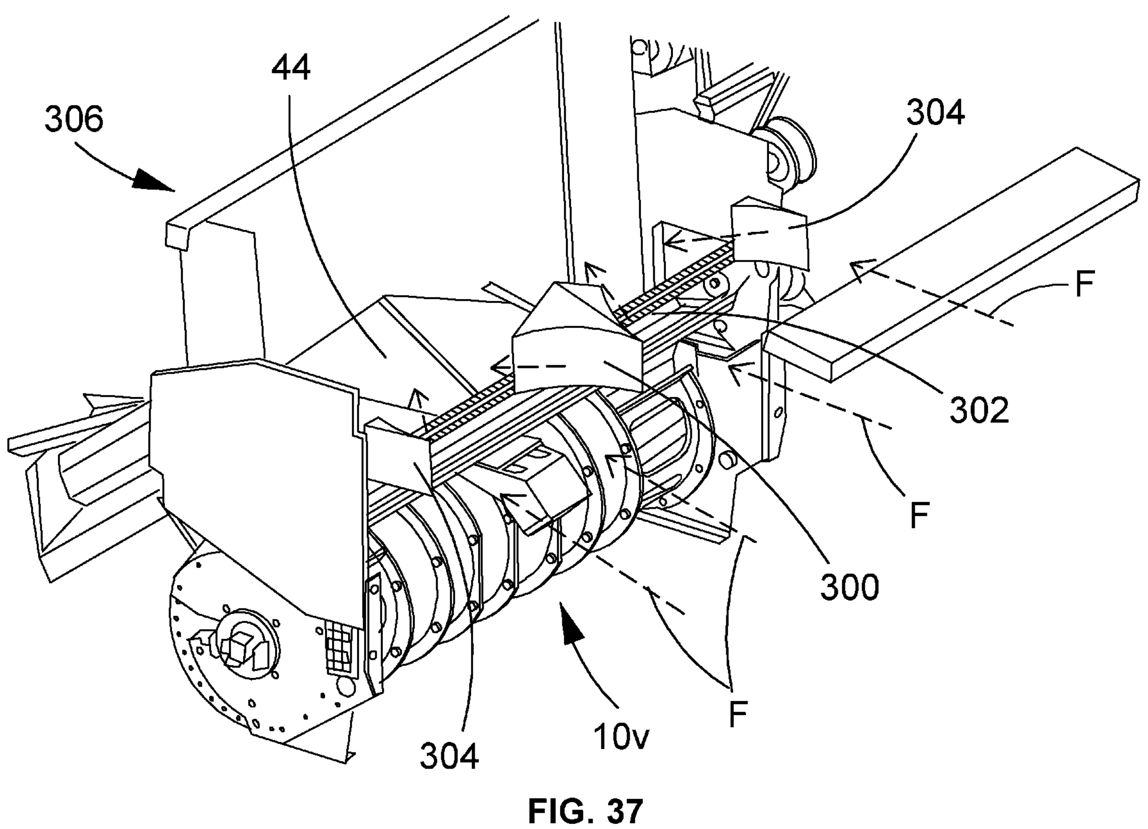
FIG. 37 is a photograph of a baffle installed in a combine at the end of a grain pan that may be used in conjunction with embodiments of the disclosed system to assist in throwing straw beyond, and therefore reduce the risk of it entering, the system.

FIG. 37 shows other modifications that may be made to a combine to enhance the integration, and/or performance of all embodiments of the disclosed system. The modifications may include but are not limited to:

a) The addition of an upstream splitter 300 on a top sieve 302 (only the forward most edge of which is shown in this drawing) of a combine in which the system/barrel is fitted. The splitter 300 acts to divide and spread a flow of chaff falling from the top sieve onto the distributor 44.

b) The addition of inwardly directed guide plates 304 on opposite sides of the top sieve 302 to direct chaff more centrally on to the underlying distributor 44. The guide plates 304 may be incorporated instead of or in conjunction with the splitter 300. In FIG. 37 the flow of chaff from the top sieve toward the system is depicted by the phantom arrows F. This Figure attempts to show that the flow of the chaff travelling along a central region of the sieve 302 is diverted as it approaches the trailing edge of the sieve 302 by the splitter 300 toward the left or right on to the underlying distributor 44, while chaff travelling along the left-hand or right-hand edges of the top sieve 302 is diverted inwardly by the guide plates 304 onto the underlying distributor 44.

c) A baffle 306 may be installed across the barrel **12*v* and distributor 44 downstream of its inlets 20. The baffle 306 may include a rubber or other pliant material curtain. The baffle 306 maybe coupled to a lifting mechanism to enable it to move in a vertical plane up or down to enable the air flow of the cleaning shoe to be balanced with the barrel. Baffle 306** is structured to allow air to pass over while not impacting air flow.

Figure 38:
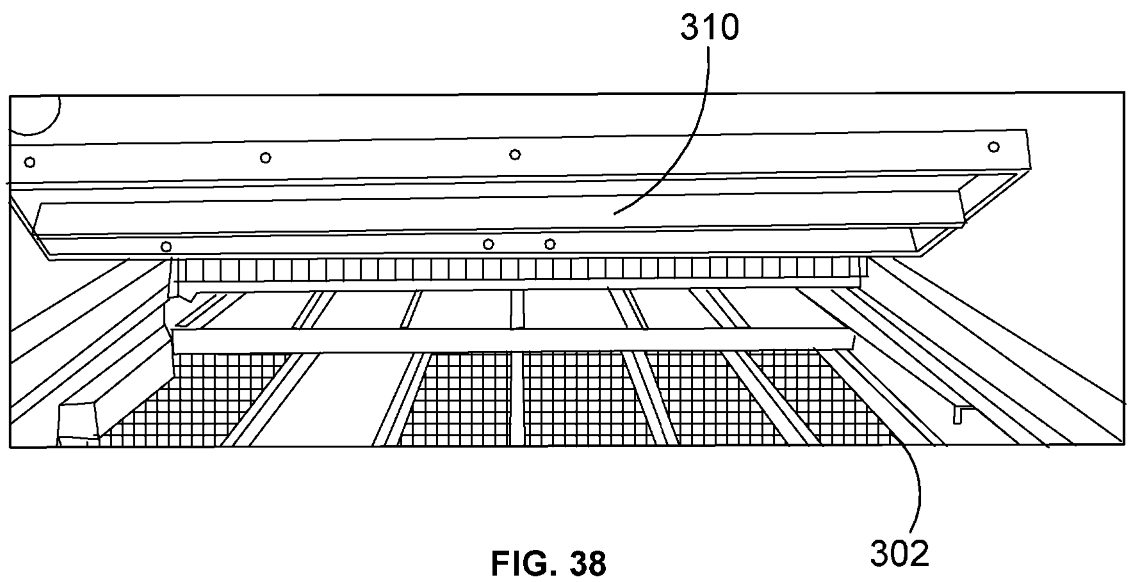
FIG. 38 is a photograph of a guide or deflect a plate installed at one side of a top sieve of a combine which may be incorporated to assist in directing chaff inwardly as it falls below onto a distributor incorporated in an embodiment of the disclosed system.

In addition to the above, integration of embodiments of the system 10 into a combine may also be improved by the installation of an extension plate or baffle 310 (see FIG. 38) at an end of a grain pan. The baffle 310 extends past the normal throw of an over-head beater. The installation of the baffle 310 may reduce the likelihood of straw entering the system 10. FIG. 38 shows an example of a baffle 310 inclined from the horizontal and extending from an end of the grain pan of a combine.

The system 10 may be installed or mounted in a combine using a powered or manual mechanism that enables the system 10 to slide (for example vertically) or to be folded/swung between a use position where the system 10 is active to devitalise weed seeds and integrate into the overall material flow through the combine; and a maintenance or access configuration where either the system 10 or other parts of the combine can be more easily accessed.

Embodiments of the system 10 may be installed so that the central axis 16 is orientated vertically rather than horizontally. Such embodiments may then utilise the action of gravity to also provide a level of control of residence time within an associate barrel 12.

Also, all embodiments of the system 10 may be coupled by way of pivot or articulated joints to a frame or other structural member of a combine and provided with actuators to enable the system 10 to be moved between various positions. This can subsequently be used to enable easy access for maintenance to various parts of the system 10 or the combine, and also to assist in directing the discharge from the outlets 22 to achieve different effects, for example discharging directly onto the ground, discharging into a straw chopper or a chaff spreader, or discharging onto a tail board.

The system 10 may be mechanically coupled to a power take off of a combine harvester, for example by way of pulleys and belts, or driveshafts, gearboxes and universal joints. Alternately the system 10 may be driven by a hydraulic motor plumbed into a combine is hydraulic system (assuming of course it has one) or an electric motor.

Embodiments of the disclosed barrel 12 and system 10 lend themselves to many further structural and operational modifications as well as facilitate the incorporation of various sensors to enable monitoring of the performance of the system 10 as well as a harvester on which it is mounted. Information obtained from the sensors may also be used to automatically modify the mill or harvester performance. Some of these are briefly discussed below.

Figure 4:
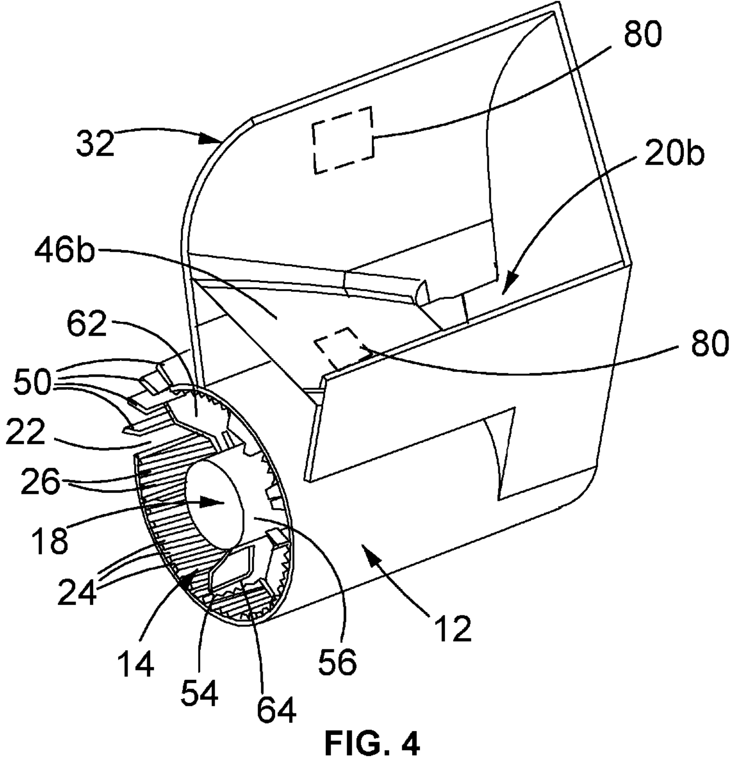
FIG. 4 is a schematic representation of the portion of the barrel and system shown in FIG. 3.
Figure 5:
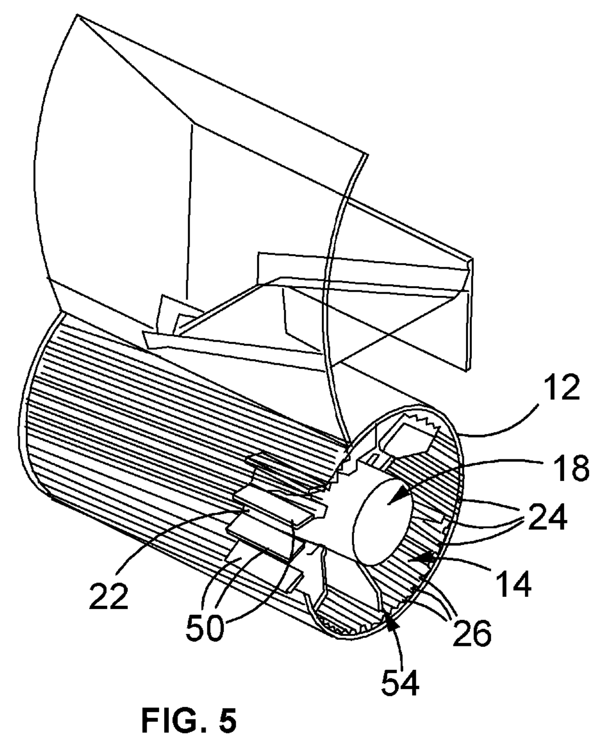
FIG. 5 is a schematic see-through representation of the portion of the barrel system shown in FIG. 3 but from an opposite direction.
Figure 6:
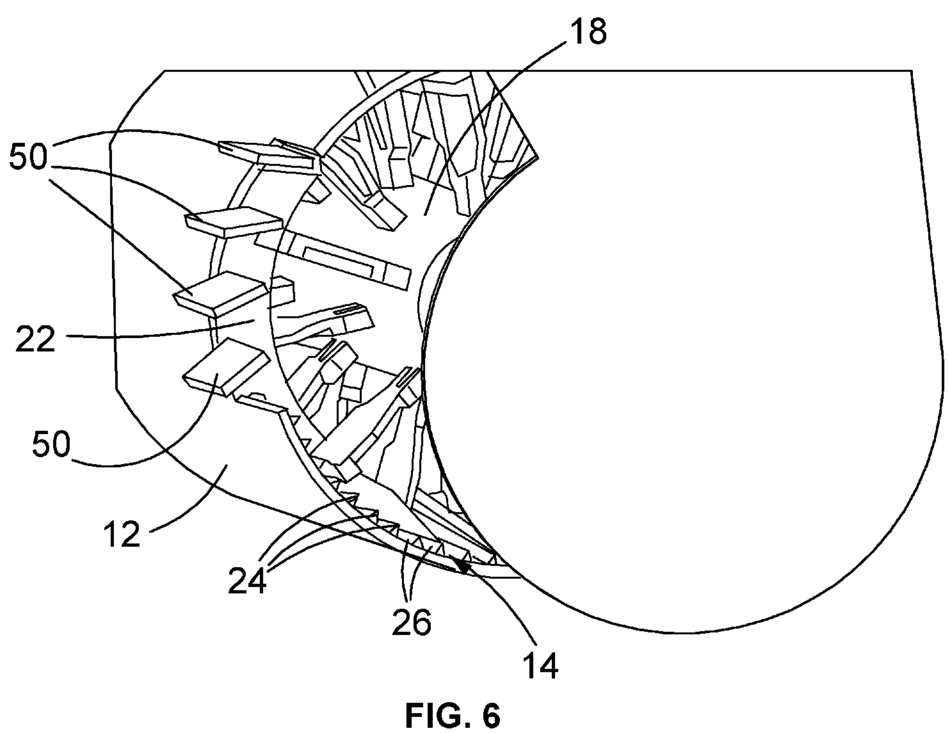
FIG. 6 is a partial cutaway view of the barrel of the system.

A gate or trapdoor may be provided on the inlet chute 34 or the distributor 44 that can be opened and closed by an actuator controlled from a cabin of the harvester for capturing a downstream sample of chaff prior to flowing into an inlet 20. Alternately automatic sampling may be incorporated. Capturing a sample of the chaff enables monitoring or measurement of grain loss in the separating system of the combine. FIG. 4 shows examples of two alternate locations for a trapdoor 80 can be selectively opened and closed to obtain a sample of the chaff. Such a trapdoor could lead to: a small receptacle for holding a sample for later testing; or alternately, feed the sample to an on-board measurement system that may make real time measurements of grain loss against samples collected at an upstream end of an associated shaft/straw separation system (e.g. a thresher). The measurement system may include an optical or vision-based system for comparing upstream and downstream samples. Information obtained from such measurements may be used for automatically adjusting header parameters of the combine via a control system that may also include artificial intelligence processing. Also, as described later information obtained from the measurement of the sample is derived from the trapdoor 80 may be used for weed mapping.

Rather than providing a trapdoor 80 in the inlet chute 34 or the distributor 44 samples may also be obtained by forming a segment 70 at an inlet 20 with a section 73 of its wall 72 that can be selectively pivoted between a sampling and a processing or operational position. In the processing position the section 73 forms part of a circumferential impact surface of the barrel 12. In the sampling position the section 73 is pivoted or swung away from a remaining portion of the wall 72 creating an opening through which some of the chaff entering the inlet 20 is diverted to a sample collection receptacle, or a measurement system. While the chaff sample taken at this location may be subject to a small degree of processing (i.e. milling) is believed that the degree of processing/milling would be sufficiently small as to not render the percentage of grains in the chaff unmeasurable.

A sample of the processed/milled material could also be taken at the outlet 22 and compared with the above-mentioned sample taken at the downstream end either by the trapdoors 80 or an inlet 20. These samples may be compared to give a measurement of the degree of processing/milling and in particular weed seed devitalisation provided by the system 10. In turn this can be compared to a prescribed target and communicated to an in-cabin monitoring and control system, or an autonomous control system. In either case the control system may be arranged to effect a change in the configuration or operational characteristics of the system 10 to achieve a target degree of processing/weed seed devitalisation. For example, the control system may be arranged to vary one, or a combination of any two or more of:

the speed of rotation of the impact mechanism 18;
torque delivered to the impact mechanism 18
position of the louvres 50;
position or degree of opening of the apertures 74;
travel speed of the combine.

Power measurement sensors may also be incorporated in the system 10 to give a measure of power (i.e. torque) loss across the system 10. This in turn gives an indication of the degree of material processing/milling provided by the system 10. The control system mentioned immediately above can use this to control one or more of the operational characteristics or settings of the mill or the combine. The power sensors may be in the form of inductive encoders that measure the torque input and output of the system 10.

In yet a further design variation the system 10 and in particular the barrel 12 can be constructed to have a bypass feature in which the barrel 12 can be opened along its entire length prior to the material traversing more than a set portion of a revolution about the axis 16. For example, with reference to FIG. 18 the barrel 12 may be constructed so that each segment 70 has a wall section 73*a* with a pivot connection Pa at the 12 o'clock position and a wall section 73*b* with a pivot connection Pb at the 6 o'clock position. Actuators (not shown) are provided to pivot the wall sections 73*a,b* from a closed position shown in FIG. 18, to an open or bypass position in which the segments are pivoted away from each other about the respective pivot connections to open the barrel 12 a long its entire axial length. As result material entering the mills 10 will undergo minimal processing (for example contacting the impact surface 14 for at most 90° about the axis 16), prior to being discharged. In this way the system 10 in this bypass configuration acts more as a chaff spreader than a mill. The bypass characteristics of the system can be further enhanced by constructing the system 10 so that sections 73 of the segments 70 can be selectively opened on an opposite side to act as additional inlets. The ultimate configuration being that the system 10 can have in effect an actuatable inlet and a bypass outlet/opening both of which extend for the full axial length of the system 10 and are rotationally offset from each other by between 30°-180° (or any sub range within this range).

Embodiments of the barrel mill composed of a plurality of segments 70 can be further modified by the provision of dedicated "outlet segments" that may be reconfigured on demand to any circumferential location and to any angular extent of open. For example, with reference to FIG. 15 the segments 70*e* and 70*f* could be replaced with the "outlet segments". These segments may be provided with walls 72 which include for example twelve individual wall portions each pivotally mounted to the segment frame 75. Each wall portion may extend for slightly more than 30°, for example about 35° each. This gives an overlap of about 5° per for each wall portion to fit for example a hinge or pivot pin. Separately controllable actuators may be provided for each wall portion. The actuators can be controlled to swing the wall portion between a closed position where it forms part of an inner circumferential wall of the barrel, and an opened position where it forms an outlet opening. So, if for example the actuators of two or three of such a mutually adjacent wall portions are activated to move them to the open position, then together the corresponding segments would form an outlet of 60° or 90°. The location of the outlet about the axis of rotation 16 can likewise be controlled by operating the appropriate actuators.

Figure 21A:
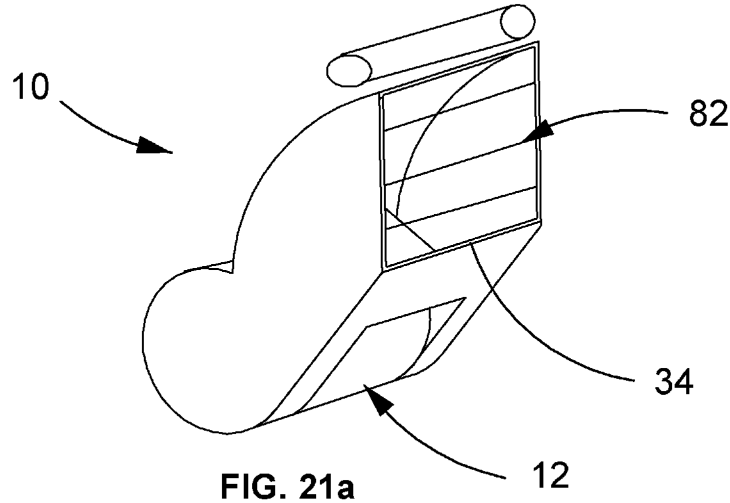
FIGS. 21*a* and 21*b* are schematic representations of a first bypass mechanism enabling the material to selectively either enter the system for processing or bypass the system that may be incorporated in various embodiments of the disclosed system.
Figure 21B:
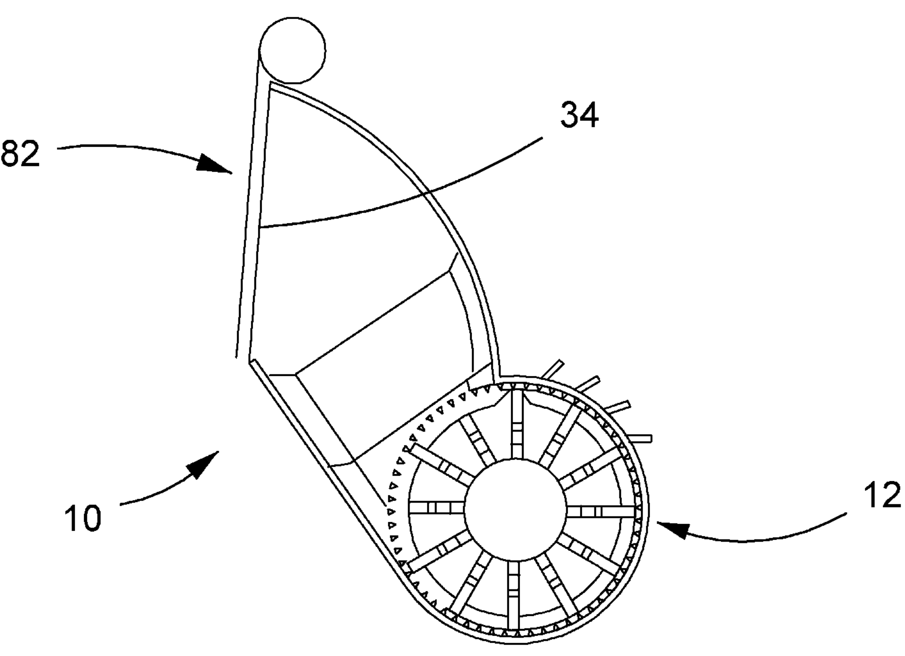

The inlet chute 34 and/or the diverter 44 may be reconfigurable between the configurations as shown in FIGS. 1-5, 7 and 8 where they direct feed material into the barrel 12 to a bypass configuration. In the bypass configuration where the material that would otherwise be fed to the barrel 12 bypasses the barrel 12/system 10 and is directed to flow to other processing or handling systems such as a spreader, chopper or tailboard. In one example a roller door 82 may be fitted across the inlet chute 34 for example as shown in FIGS. 21*a* and 21*b*. The roller door 82 can be moved between an opened position in which it leaves the chute 34 fully open, to a fully closed position depicted in these Figures, which closes the inlet chute 34 so the mill/barrel is bypassed, and the material is diverted: to an alternate processing device such as a spinner, chopper or, tailboard; or, directly onto the ground.

Figures 22A, 22B:
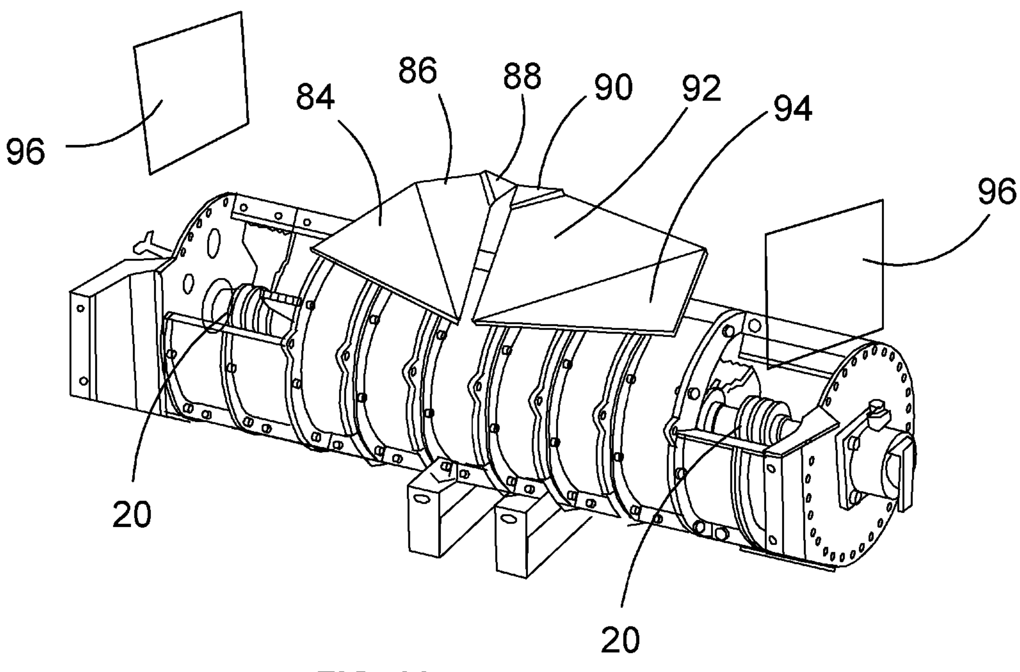
FIGS. 22*a* and 22*b* are schematic representations of a second bypass mechanism enabling the material to selectively either enter the system for processing or bypass the system.

There are other ways of achieving the same bypassing effect as described immediately above. For example, the distributor 44 may be reengineered as a reconfigurable structure comprising a plurality of panels 84, 86, 88, 90, 92 and 94, together with foldable side panels 96, all of which are coupled together to move between a first configuration as shown in FIGS. 22*a* and 22*b*. In FIG. 22*a* the diverter panels 84, 86, 88, 90, 92 and 94 are shown in the diverting configuration in which material is diverted to the inlets 20. The foldable side panels 96 are upright allowing material to flow into the inlets 20. In FIG. 22*b* the diverter panels 84, 86, 88, 90, 92 and 94 have been folded down to a ramp like configuration, and the side panels 96 have been folded down to cover the inlets 20. Now material that is directed to the system 10 bypasses the inlets 20 flowing over the folded down diverter panels 84-94 and side panels 96.

In addition to the above-mentioned torque sensors, other sensors may be provided to provide operational data and signals to a processor and/or a communications system. The sensors may include:

1. one or more blockage sensors arranged detect blockage in or reduced mass flow rate of material through the system 10;
2. one or more vibration sensors arranged to sense vibration arising from rotation of the impact mechanism 18;
3. temperature sensors to the temperature of bearing associated with the impact mechanism 18;
4. one or more proximity sensors to provide or cause the generation of an alarm when a person is within a designated distance of the impact mechanism when it is rotating. Such sensors may also be arranged to directly or indirectly activate a light and/or an audible signal generator to indicate or otherwise show that the impact mechanism 18 is still rotating thereby alert the person that machine is not safe to work on;

5. air pressure sensors at various locations along the barrel 12

These sensors may feed their output signals/data to a data processor associated with the system 10 or a combine or other agricultural machine incorporating the disclosed system 10. The communication system may also be provided with the system 10 or a combine or other agricultural machine incorporating the disclosed system 10. The communications system or data processor may also include a GPS.

The provision of data processing and communication systems enables data, signals or information from any one or more of the sensors to be communicated via a communications network including but not limited to the Internet or the Internet of Things, to a remote location and/or the operator's cab of the combine. The data, signals or information from the sensors may be provided directly from the sensors, or, as processed data, signals or information subsequent to processing by the data processor, or both.

Communicating the data, signals or information enables remote monitoring of the performance of the mill 10 as well as the combine harvester. The remote monitoring can for example enable manual or automated communication to a combine operator or a service department of performance characteristics of the system 10 and/or the combine harvester. The performance characteristics may include: information regarding wear of various components, the need for maintenance, or the provision in real time of alerts or alarms to the combine operator of potentially dangerous performance characteristics such as bearing temperature.

The data, signals or information may also be used, together with other operational information communicated via the communication system such as forward speed of the combine harvester and GPS data, to calculate the amount of material processed by the system 40/associated combine harvester including geographically tagging the data. Other possibilities include weed mapping with the volume or density of weeds obtained either through the sampling of the material processed by the mill using samples for example obtained through the trapdoors 80, or by optical detection of weeds via detectors on the combine immediately prior to cropping and tagging this to corresponding GPS data. Biomass mapping is also possible for example by use of the above described torque sensors. This may be beneficial in terms of different business or revenue models for commercialisation of the system 40 and/or combine harvester in enabling for example lease payments/charges being made on the basis of the calculated amount of material processed by the combine harvester.

The data, signals or information from the sensors and processed can be used in real time or otherwise to:

to alert the combine harvester operator of various operational characteristics of the system 10 (to a component/sub-system level) and/or the harvester;

signal the need for maintenance and/or repair;

determine performance characteristics of the system 10 and/or the combine harvester;

enable calculation of throughput of material processed by the system 10 and/or the combine harvester.

The data, signals and information communicated to the remote location may be stored locally or on a cloud-based system. In any event the data, signals and information may be fed to a machine learning/artificial intelligence system. This in turn may be arranged for example to: forecast expected lifespan of components, system 10 throughput; and/or suggest potential adjustments to system or combine harvester parameters to improve operational efficiency.

The sensors may be operatively coupled to the data processor which can be programmed to take one or more specific actions if a blockage or an anomalous change in material flow is detected. These actions may include but are not limited to: operating a high-pressure air compressor to direct one of jets of air to a location where the change in material flow or blockage is detected; and/or reducing the ground speed of the system 10 or combine to reduce the volume of material being directed to the blockage site. In the latter case the data processor may alert an operator if and when that the blockage has cleared to enable a resumption of normal travel speed.

Embodiments of the disclosed system may also include actuators or structures to enable variation of configuration, position or interrelationship of component parts to facilitate control over aspects such as residence time of material within the system 10. For example, the position and angle of the flails (axial component) may be varied manually prior to the operation or automatically through the use of actuators. In addition or alternately the following characteristics may be varied: the degree of aggressiveness/roughness of the impact surface 14 (e.g. the ribs 24 or the shape depth and configuration of the valleys 128 of the surface 14*t*, shown in FIGS. 10-12; which varies both of the degree of devitalisation but also the flow path of material and thus residence time; the degree of opening or closing of the outlets 22 for example using the control system 129 shown in FIGS. 24*a*-25.

Wear sensors may also be installed in and as part of the system 10 to provide signals to an overall system control and monitoring system to provide an indication of the wear of the impact surface 14 of the barrel 12, or wear of the hammers 54. For example: a wear sensor that may be in the form of a plurality of conductors or one or more conductive meshes, may be impregnated in the impact surface 14 that break to change a measurable electrical characteristic such as current flow, resistance or capacitance when worn. Other examples include a load cell on a sacrificial wear plate; or ultrasonic thickness or surface roughness sensors. A proximity sensor may be incorporated to measure distance from the surface 14 to the flails/hammers 54 to measure wear. The signals from the wear sensors may provide feedback via an IoT system to enable global mapping of wear and continuous improvement.

In relation to the overall control of the system 10 the previously mentioned torque sensors may be provided to enable sensing of torque in the shaft 52 to enable a determination of power imparted to the material flowing through the system 10. From this control algorithms may be implemented to automatically adjust settings of the system 10 based on torque to optimise for seed kill, for engine power available and for optimum distribution of power available for destroying seeds, chopping straw and spreading both.

In the claims which follow, and in the preceding description, except where the context requires otherwise due to express language or necessary implication, the word "comprise" and variations such as "comprises" or "comprising" are used in an inclusive sense, i.e. to specify the presence of the stated features but not to preclude the presence or addition of further features in various embodiments of the system and method as disclosed herein.

The invention claimed is:

1. A material processing system comprising:

a barrel like structure having a circumferential wall with an impervious inner impact surface extending circumferentially about a central axis of the barrel like structure, respective inlet openings located at or near opposite axial ends of the barrel like structure, and an outlet opening located between the respective inlet openings; and an aperture mechanism located between one of the inlet openings and the outlet opening, the aperture mechanism arranged to enable control of a flow of material between the one of the inlet openings and the outlet opening.

2. The material processing system according to claim 1, wherein the barrel like structure comprises a plurality of circumferential segments demountably coupled together along the central axis, each segment having a circumferential wall portion with an inner impact surface portion; wherein the circumferential wall portions of the segments together form the circumferential wall of the barrel like structure, and the inner impact surface portions of the segments together form with the impact surface of the barrel like structure.

3. The material processing system according to claim 2, wherein the circumferential wall portion of each of at least a first, a second and a third segment is provided with an opening, wherein the first and second segments are located at respective opposite ends of the central axis and the third segment is located between the first and second segments, wherein the openings of the first and second segments form respective inlet openings and the opening of the third segment forms the outlet opening and wherein material that enters through an inlet opening is processed against the inner impact surface prior to exiting through the outlet opening.

4. A material processing system comprising:

a barrel like structure having a circumferential wall with an impervious inner impact surface extending circumferentially about a central axis of the barrel like structure, respective inlet openings located at or near opposite axial ends of the barrel like structure, and an outlet opening located between the respective inlet openings; and an aperture mechanism located between one of the inlet openings and the outlet opening, the aperture mechanism arranged to enable control of a flow of material between the one of the inlet openings and the outlet opening, wherein the aperture mechanism comprises a central opening having a user selectable area.

5. A material processing system comprising a barrel like structure having a circumferential wall with an impervious inner impact surface extending circumferentially about a central axis of the barrel like structure, respective inlet openings located at or near opposite axial ends of the barrel like structure, and an outlet opening located between the respective inlet openings, wherein:

(a) one or more screens located across the outlet opening; or (b) one or more louvers located in or across the outlet opening and operable for varying an effect open area of the outlet opening; or (c) one or more screens located across the outlet opening and one or more louvers located in or across the outlet opening and operable for varying an effect open area of the outlet opening.

6. A material processing system comprising:

a barrel like structure having a circumferential wall with an impervious inner impact surface extending circumferentially about a central axis of the barrel like structure, respective inlet openings located at or near opposite axial ends of the barrel like structure, and an outlet opening located between the respective inlet openings; and an outlet control system operable to vary axial distance from an inlet opening to the outlet opening.

7. The material processing system according to claim 6, wherein the outlet control system comprises one or more movable covers arranged to selectively move between different positions which cover or uncover portions of the outlet opening.

8. The material processing system according to claim 6, further comprising an impact mechanism rotatably supported to rotate about the central axis, the impact mechanism arranged to impact material entering the barrel and accelerate the material to impact against the impact surface.

9. A material processing system comprising a barrel like structure having a circumferential wall with an impervious inner impact surface extending circumferentially about a central axis of the barrel like structure, respective inlet openings located at or near opposite axial ends of the barrel like structure, and an outlet opening located between the respective inlet openings, and further comprising an impact mechanism rotatably supported to rotate about the central axis, the impact mechanism arranged to impact material entering the barrel and accelerate the material to impact against the impact surface, wherein the impact mechanism comprises a shaft and a plurality of hammers coupled to the shaft.

10. The material processing system according to claim 9, wherein the hammers are pivotally or otherwise flexibly coupled to the shaft enabling a swinging motion or deflection of the hammers in a radial plane.

11. The material processing system according to claim 9, wherein at least some hammers are located near an inlet opening and are curved in a direction forward of a direction of rotation of the shaft.

12. The material processing system according to claim 9, wherein at least some hammers are located at or near the outlet opening and are curved in a direction rearward of a direction of rotation of the shaft.

13. A combine harvester having the material processing system according claim 9, and arranged to devitalise weed seeds contained in a chaff flow produced by the combine harvester during harvesting of a crop, further comprising a drive system arranged to transfer drive from an engine or a power take off of the combine harvester to the material processing system to cause rotation of the impact mechanism.

14. The combine harvester according to claim 13, wherein the material processing system is coupled to a frame or other structural member of the combine harvester and provided with actuators to enable the material processing system to be moved between various positions enabling access for maintenance to various parts of the material processing system or the combine.

15. The combine harvester according to claim 13, wherein the material processing system is coupled to a frame or other structural member of the combine harvester and provided with actuators to enable the material processing system to be moved between various positions enabling processed material flowing from an outlet opening of the material processing system to be discharged: directly onto the ground; or, into a straw chopper or a chaff spreader supported on the combine harvester; or, onto a tail board supported on the combine harvester.

16. The combine harvester according claim 13, further comprising an inlet chute or diverter configurable between a feed configuration and a bypass configuration wherein in the feed configuration the inlet chute or diverter operates to direct chaff into an inlet opening of the barrel like structure, and in the bypass configuration the inlet chute or diverter operates to direct chaff to bypass the inlet opening and direct the chaff to flow to other processing or handling systems or directly onto the ground.

17. A material processing system for processing weed seeds comprising:

a barrel like structure having a circumferential wall with an impervious inner impact surface extending circumferentially about a central axis of the barrel like structure;

at least one inlet opening to the barrel like structure and at least one outlet opening from the barrel like structure, the at least one inlet opening and the at least one outlet opening being spaced along the central axis wherein the at least one inlet opening and the at least one outlet opening comprise:

(i) respective inlet openings located at or near opposite axial ends of the barrel like structure, and an outlet opening located between the respective inlet openings; or, (ii) respective outlet openings located at or near opposite axial ends of the barrel like structure, and an inlet opening located between the respective outlet openings; and an impact mechanism rotatably supported to rotate about the central axis, the impact mechanism arranged to impact material entering the barrel and accelerate the material to impact against the impact surface, the impact mechanism having a shaft and a plurality of hammers coupled to the shaft wherein at least one of the hammers has an impact side that is substantially planar and lies in an axial plane of the barrel like structure for impacting weed seeds that enter the barrel like structure through the at least one inlet opening and accelerating the weed seeds onto the impact surface to thereby fragment and devitalize the weed seeds.

18. The material processing system according to claim 17, wherein the hammers are pivotally or otherwise flexibly coupled to the shaft enabling a swinging motion or deflection of the hammers in a radial plane.

19. The material processing system according to claim 17, wherein the impact surface is configured to guide, or otherwise induce motion of, the material entering through the at least one inlet to travel in a spiral path about the axis toward the at least one outlet opening.

20. The material processing system according to claim 17, comprising an outlet control system operable to vary axial distance from an inlet opening to an outlet opening.

21. The material processing system according to claim 20, wherein the outlet control system comprises one or more movable covers arranged to selectively move between different positions which cover or uncover portions of the at least one outlet opening.

22. The material processing system according to claim 20, further comprising one or more screens located across each outlet opening.

23. The material processing system according to claim 17, further comprising:

(a) one or more screens located across the at least one outlet opening; or (b) one or more louvers located in or across the at least one outlet opening and operable for varying an effect open area of the at least one outlet opening; or (c) one or more screens located across the at least one outlet opening and one or more louvers located in or across the at least one outlet opening and operable for varying an effect open area of the at least one outlet opening.

* * * * *